United States Patent [19]
Wadsworth et al.

[11] Patent Number: 6,067,407
[45] Date of Patent: *May 23, 2000

[54] REMOTE DIAGNOSIS OF NETWORK DEVICE OVER A LOCAL AREA NETWORK

[75] Inventors: Robert D. Wadsworth, Costa Mesa; William C. Russell, Laguna Hills; Jefferson F. Talbott, Silverado, all of Calif.

[73] Assignee: Canon Information Systems, Inc., Irvine, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/497,122

[22] Filed: Jun. 30, 1995

[51] Int. Cl.⁷ .................................................. G06F 13/00
[52] U.S. Cl. ................................ 395/200.8; 395/200.5; 395/200.53; 395/200.54; 395/200.6; 395/200.79; 395/568; 395/733; 395/734; 395/737; 395/DIG. 1; 395/DIG. 2; 710/106; 710/128
[58] Field of Search ..................................... 395/500, 650, 395/200.02, 200.01, 700, 200.04, 200.12, 800, 831, 821; 370/94.1, 85.5, 85.2, 62, 60, 389, 449, 384, 256, 338, 401, 471, 402, 257; 379/389, 202; 358/468, 119, 183; 710/10, 32, 72, 128, 129, 71, 262, 106; 364/DIG. 1, DIG. 2

[56] References Cited

U.S. PATENT DOCUMENTS

| | | | |
|---|---|---|---|
| 4,589,068 | 5/1986 | Heinen, Jr. | 395/704 |
| 4,695,946 | 9/1987 | Andreasen et al. | 395/183.07 |
| 4,701,845 | 10/1987 | Ardreasen et al. | 395/183.07 |
| 4,837,764 | 6/1989 | Russello | 371/20 |
| 4,897,874 | 1/1990 | Lidinsky et al. | 380/3 |
| 4,941,089 | 7/1990 | Fischer | 395/200.61 |
| 5,021,949 | 6/1991 | Morten et al. | 395/200.61 |
| 5,119,377 | 6/1992 | Cobb et al. | 371/19 |
| 5,163,052 | 11/1992 | Evans et al. | 371/18 |
| 5,228,039 | 7/1993 | Knoke et al. | 371/19 |
| 5,276,863 | 1/1994 | Heider | 395/200.12 |
| 5,305,317 | 4/1994 | Szczepanek | 370/257 |
| 5,323,393 | 6/1994 | Barrett et al. | 370/85.8 |
| 5,357,519 | 10/1994 | Martin et al. | 371/15.1 |
| 5,379,296 | 1/1995 | Johnson et al. | 370/60 |
| 5,383,178 | 1/1995 | Unverrich | 370/85.5 |
| 5,388,252 | 2/1995 | Dreste et al. | 395/700 |
| 5,394,436 | 2/1995 | Meier et al. | 375/202 |
| 5,428,636 | 6/1995 | Meier | 375/202 |
| 5,438,528 | 8/1995 | Emerson et al. | 395/185.09 |
| 5,448,561 | 9/1995 | Kaiser et al. | 370/471 |
| 5,457,806 | 10/1995 | Kitamura | 371/32 |
| 5,465,331 | 11/1995 | Yang et al. | 395/200.74 |
| 5,485,460 | 1/1996 | Schrier et al. | 370/389 |
| 5,504,746 | 4/1996 | Meier | 370/256 |
| 5,530,862 | 6/1996 | Wadsworth et al. | 395/651 |
| 5,606,671 | 2/1997 | Wadsworth et al. | 710/106 |
| 5,724,555 | 3/1998 | Wadsworth | 358/468 |

OTHER PUBLICATIONS

"The Open Data–Link Interface (ODI) Overview", Novell Labs Marketing, Revision 1.5, Mar. 15, 1993.

*Primary Examiner*—Jacques H. Louis-Jacques
*Attorney, Agent, or Firm*—Fitzpatrick, Cella, Harper & Scinto

[57] ABSTRACT

Dump and debug utilities which provide mechanisms, for a network user from his or her workstation which is connected to a local area network, to remotely examine and control software executing on an interface board connected elsewhere to the network. The dump and debug facilities allow a network user to locate accessible interface boards and to issue dump and debug commands by which dump/debug network packets are constructed, and transmitted over the LAN to the interface board. Thereafter, the dump and debug utilities receive dump/debug packets generated by the interface board in response to the workstation packet, decode the packet, and display the results to the user. At the interface board side, the dump/debug packets received from the network workstation are intercepted by the data link layer of the board's interrupt handler, and are processed in an interrupt-disabled state whereby appropriate dump and debug capabilities can be carried out even if the interface board is otherwise non-operational.

33 Claims, 13 Drawing Sheets

EXAMPLES OF DIFFERENT NETWORKS

| LAYER | NETWARE 2.x & 3.x | NETWARE 4.x | TCP/IP OVER NETWARE | TCP/IP |
|---|---|---|---|---|
| APPLICATION | PSERVER, RPRINTER, SOCKET MANAGER, FILE MANAGER, ETC. | | | |
| PRESENTATION | NETX (NETX. EXE) | VLM (VLM. EXE) | SOCKET INTERFACE | SOCKET INTERFACE |
| SESSION | SPX (IPX. COM) | SPX (IPXODI. COM) | TCP | TCP |
| TRANSPORT | IPX (IPX. COM) | IPX (IPXODI. COM) | IP | IP |
| NETWORK | | | | |
| DATA LINK LLC | | LSL (LSL. COM) | LSL (LSL. COM) | |
| DATA LINK MAC | | MLID(ODI DRIVER) | MLID(ODI DRIVER) | PACKET DRIVER |
| PHYSICAL | COMPUTER, PC BIOS, NETWORK INTERFACE CARD, NETWORK CABLE | | | |

FIG. 4

REMOTE DIAGNOSIS OF NETWORK DEVICE OVER A LOCAL AREA NETWORK

BACKGROUND OF THE INVENTION

1. Field of the Invention

The present invention concerns techniques for remotely diagnosing a network device over a local area network (LAN), for example, from a workstation on the LAN which is located remotely of the network device. More specifically, the invention concerns transmission from the workstation of specialized dump/debug network communication packets which are responded to by the lowest network device driver on the network device in an interrupt-disabled state.

2. Description of the Related Art

With increasingly wide usage of computerized local area networks (LANs), it is becoming more and more common to connect peripheral devices such as printers and scanners to such LANs so as to permit those peripheral devices to be accessible from any workstation or computer on the LAN. While in the past it has been necessary to provide a dedicated personal computer such as an IBM-PC or PC-compatible computer so as to interface between the peripheral device and the LAN, it has more recently been proposed to provide such interface functions on a single interface board connected to the peripheral. U.S. Pat. No. 5,323,393 to Barrett, et al., and U.S. application Ser. No. 08/409,034, now U.S. Pat. Nos. 5,724,555 "Network Interface Board For Digital Copier", both assigned to the same assignee as the present application, both describe examples of such interface boards.

At the same time, the LANs themselves have become more complex, particularly with regard to the different kinds of network communications carried thereon. For example, it has recently become possible for a single LAN to carry on several different types of communications at the same time, for example, Novell-based communications between IBM-compatible personal computers, TCP/IP-based communications for UNIX-type workstations, and AppleTalk-based communications for Apple-type computers such as MacIntosh. Thus, in order to interface between such a complicated LAN and a peripheral device, the interface board for the peripheral device must also be complicated so as to be able to provide a robust platform over which network communications to the peripheral can be carried out.

In the real world, however, not every single eventuality on the network can be foreseen. These unforeseen eventualities can cause problems to occur on the interface board which make the interface board non-operational for reasons which need to be ascertained. While a memory dump or debug facility may assist in diagnosing those reasons, since the interface board is non-operational it is difficult to obtain a memory dump or to initiate a debug facility.

Ser. No. 08/336,102, "Low-Cost Serial Port", proposed a serial port physically located on the interactive board which functioned with the non-maskable interrupt of the board's microprocessor so as to permit dump and/or debug facilities. The proposed serial port effectively allows diagnosis of the reasons as to why the interface board has become non-operational. However, room for improvement is needed with respect to at least two areas.

First, since the proposed serial port of Ser. No. 08/336,102 is physically co-located with the interface board, the technician diagnosing problems on the interface board must also be physically co-located with the interface board. Second, since the serial port offers only serial cnmmunications with the interface board, transmission of large amounts of data, such as might be encountered in a full memory dump, consumes an unduly lengthy period of time.

Thus, a need exists for dump and/or debug facilities for a network interface board which can be carried out remotely of the interface board and which can carry large amounts of data in a short amount of time.

SUMMARY OF THE INVENTION

These needs are addressed by the present invention in which dump and/or debug capabilities are carried out over the local area network itself.

Briefly, according to the invention, dump and debug utility programs are provided on any workstation on the LAN. These dump and debug utility programs generate dump/debug network communication packets which are transmitted to an interface board for which diagnosis is desired. The interface board includes an interrupt-driven network driver program which, in an interrupt-disabled state, responds to the dump/debug network packets so as to cause desired dump and/or debug facilities to be executed. Results of the dump and/or debug facilities are then transmitted from the interface board, back across the LAN, to the workstation from which the request was initially issued.

Because the dump and debug utilities are executed from any network workstation, it is possible to diagnose problems on an interface board is remotely from the interface board. In addition, because dump and debug data communications are carried out over the network, which is a high speed data communication device, large amounts of data can be transmitted quickly.

Moreover, because the interface board responds to dump/debug network communication packets in an interrupt-disabled state, it is in general always possible to obtain access to the interface board, no matter what problem state the interface board is in. For example, even if the interface board is in an infinite software loop, since the debug/dump packet is responded to within a hardware interrupt handler and in an interrupt disabled state, even the infinite software loop will be interrupted so as to respond to the debug/dump packet.

Thus, in one aspect, the invention is a network device that interfaces between a local area network and a network peripheral, the network device having a protocol stack which extends from a physical network layer, through an interrupt-driven data link layer, to an application layer which services the peripheral, the data link layer including a module which is triggered by a unique dump/debug packet header and which interprets proprietary debug commands stored in the data portion of the packet and which in an interrupt-disabled state executes the dump/debug commands. The dump/debug commands may include commands to dump some or all of memory of the network device, and may include commands to store data in the packet to specific locations of memory of the network device. Storage of some predetermined pieces of data may, in turn, cause the network device to enter into debug modes of operation, such as storage of data which causes a subsequent break-in into an interactive debug mode.

Because the device driver is interrupt driven and executes the dump/debug commands in an interrupt-disabled state, the foregoing arrangement can effectively provide for dump/debug services to a remote workstation even if the only piece of operational software on the network device is the device driver itself.

In another aspect, the invention provides a dump utility on a workstation of a local area network to which is also connected an interface board for a network peripheral, the dump utility including a user interface for accepting user-originating dump commands, process steps for constructing a dump/debug network packet containing dump/debug commands in accordance with user-originated commands, process steps to send the dump/debug packet across the LAN to the interface board, process steps to receive a dump/debug packet originating from the interface board via the LAN, and process steps to display dump results to the user.

By virtue of the foregoing arrangement, since the dump utility sends dump/debug commands via the local area network, it is possible to diagnose problems on the interface board remotely of the physical location of the interface board itself. In addition, it is also possible to receive lengthy dumps of memory and the like from the interface board in a short amount of time since a speedy network communication device is utilized.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 4 is a view for explaining implementation of the ISO-OSI network model on different networks.

DETAILED DESCRIPTION OF THE INVENTION

In its most preferred form, the invention is embodied in a local or wide area network which includes plural workstations from which a dump and/or debug utility is executed, as well as at least one interface board which interfaces between the LAN and a peripheral such as a printer, a scanner, a facsimile machine, a copier, an image processing apparatus and so on. Suitable interface boards are described in the aforementioned U.S. Pat. Nos. 5,323,393 and 5,724,555, and a general description of suitable interface boards is provided herein.

[Network Architecture]

Figure 1:
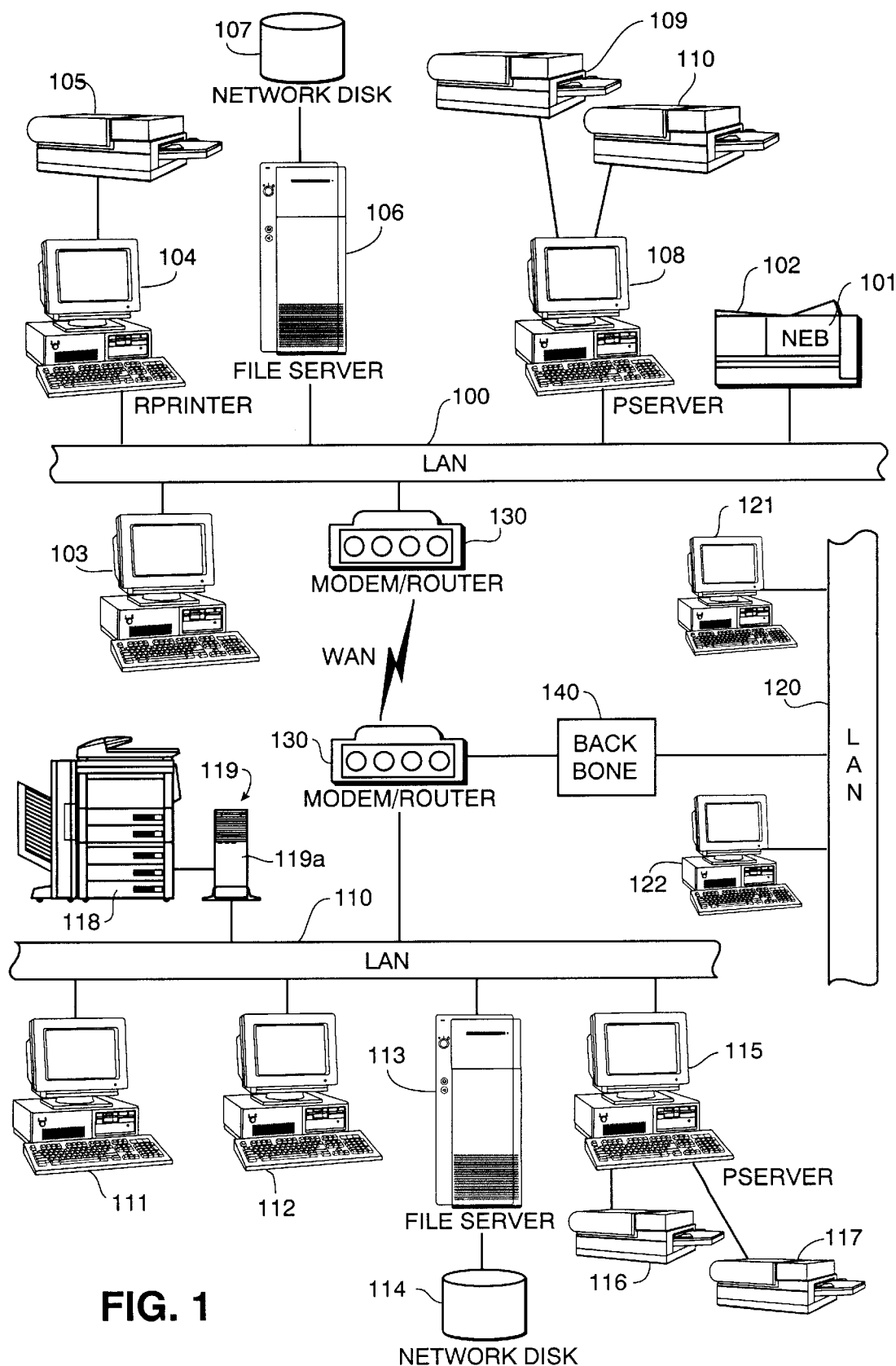
FIG. 1 is a view showing a local area network and a wide area network.

FIG. 1 is a diagram showing an interface board 101 which interfaces between a printer 102 and a local area network (LAN) 100 through a suitable LAN interface, for example, an Ethernet interface 10 Base-2 with coax connector or a 10 Base-T with RJ45 connector.

Plural workstations, such as workstations 103 and 104, are also connected to LAN 100, and under control of a suitable network operating system such as a Novell network operating system, those workstations are able to communicate with interface board 101. One of the workstations, such as workstation 103, may be designated for use as a network administrator. One or more workstations may also have a printer connected to it, such as printer 105 connected to workstation 104.

Also connected to LAN 100 is file server 106 which manages access to files stored on a large capacity (e.g., 10 gigabyte) network disk 107. A print server 108 provides print services to printers 109 and 110 connected to it, as well as to remote printers such as printer 105. Other unshown peripherals may also be connected to LAN 100.

In more detail, the network depicted in FIG. 1 may utilize any network operating system software such as Novell or UNIX software in order to effect communication among the various network members. The present embodiments will be described with respect to a LAN utilizing Novell NetWare® software, although any network software could be used. A detailed description of this network software may be found in "NetWare® User's Guide" and "NetWare® Supervisor's Guide", published by M&T Books, copyrighted 1990, incorporated herein by reference. See also the "NetWare® Printer Server" by Novell, March 1991 edition, Novell Part No. 100-000892-001.

Briefly, file server 106 acts as a file manager, which receives, stores, queues, caches, and transmits files of data between LAN members. For example, data files created respectively at workstations 103 and 104 may be routed to file server 106 which may order those data files and then transfer the ordered data files to printer 109 upon command from print server 108.

Workstations 103 and 104 may each comprise a standard IBM-PC or PC-compatible computer, capable of generating data files, transmitting such data files onto LAN 100, receiving files from LAN 100, and displaying and/or processing such files. Other computer equipment may also be incorporated into LAN 100, as appropriate to the network software being executed. For example, UNIX workstations may be included in the network when UNIX software is used, Apple MacIntosh computers may be included in the network when AppleTalk software is used, and all of those workstations may intercommunicate and communicate with interface board 101 under suitable circumstances which are described below.

Typically, a LAN such as LAN 100 services a fairly localized group of users such as a group of users on one floor or contiguous floors in a building. As users become more remote from one another, for example, in different buildings or different states, a wide area network (WAN) may be created which is essentially a collection of several LANs all connected by high speed digital lines, such as high speed integrated services digital network (ISDN) telephone lines. Thus, as shown in FIG. 1, LANs 100, 110 and 120 are connected to form a WAN via modulator/demodulator (MODEM)/transponder 130 and backbone 140, which is simply an electrical connection between several buses. Each LAN includes its own workstations, and each ordinarily includes its own file server and print server, although that is not necessarily the case.

Thus, as shown in FIG. 1, LAN 110 includes workstations 111 and 112, file server 113, network disk 114, print server 115 and printers 116 and 117. Also connected to LAN 110 is digital copier/printer 118, which may be a canon GP-55 printer/copier. Printer/copier 118 is connected to LAN 110 via multi-device controller 119 which includes an unshown interface board 119a for interfacing between the multi-device controller (and hence, digital printer/copier 118) and LAN 110. Interface board 119a is another example of an interface board in which the present invention finds particular utility.

LAN 120 includes only workstations 121 and 122, and is not provided with its own file server or printers. Thus, workstations 121 and 122 must ordinarily utilize the printer services found remotely on LAN 100 or LAN 110, and such is readily provided for via the aforementioned interconnection of LANs 100, 110 and 120 into a wide area network. In general, via the wide area network connections, equipment in any of LANs 100, 110 and 120 can access the capabilities of equipment in any other of the LANs.

Workstation 104 may be embedded with an RPRINTER software program, and as such may exert limited control over network peripherals. The RPRINTER program is an MS-DOS terminate-and-stay-resident ("TSR") program that allows users to share printer 105 connected to workstation 104 while at the same time allowing workstation 104 to execute other non-print applications. RPRINTER is a relatively unintelligent program that does not have the ability to search printer queues for work. RPRINTER gets its work from print servers, such as the PSERVER program running on dedicated PC 108, as well as other print servers running elsewhere in the network.

PSERVER running on dedicated PC 108 is capable of exercising more significant control over LAN peripherals but requires a dedicated PC, here PC 108 which cannot be used for any other task. PSERVER has the ability to service multiple user-defined print queues, perform dynamic search queue modification, and provide defined notification procedures for exception (failure) conditions and status and control procedures, and can control both local printers 109 and 110 (that is, printers physically connected to PC 108) and as well as remote printers via the aforementioned RPRINTER. Local printers 109 and 110 can be connected to either serial or parallel ports, and the remote printers, such as printer 105, are printers running elsewhere in the system which PSERVER controls through RPRINTER software.

[Interface Board]

Interface boards which interface between the network and a peripheral, such as interface boards 101 and 119a which interface between the network and printer 102 and printer/copier 118, respectively, reduce the need for dedicated PCs whose sole purpose is to service a peripheral. The architecture of the interface board provides an advantage in that the interface board includes support features for administration and management of large, multi-area WAN networks. In the case where the peripheral served by the interface board is a printer, these support features can include, for example, printer control and status monitoring from a remote location on the network, such as from the network administrators office, automatic management of printer configuration after each print job so as to provide a guaranteed initial environment for the next user, and printer logs or use of statistics accessible across the network and which characterize printer workloads and schedules for toner cartridge replacement.

Figure 2:
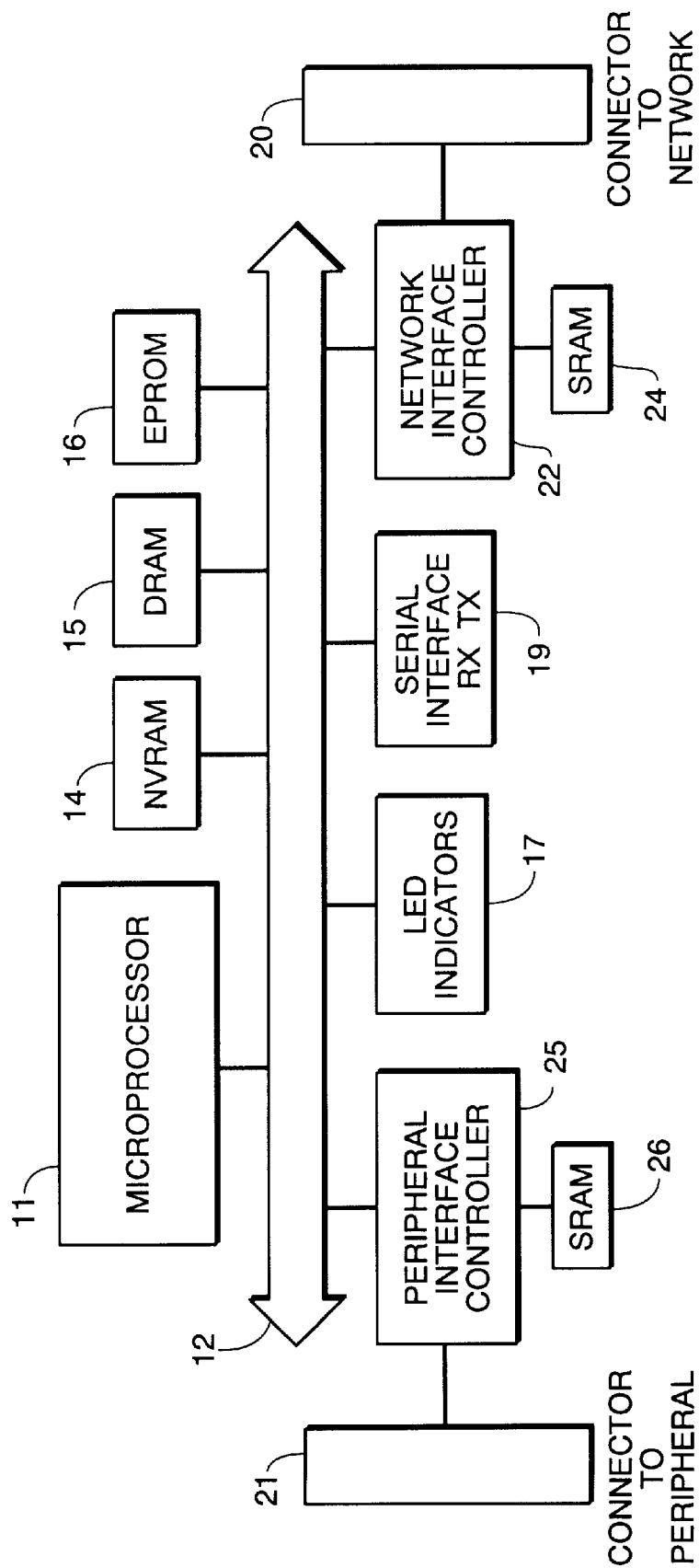
FIG. 2 is a block diagram showing an interface board between a local area network and a peripheral device.

In implementing the present invention, the precise hardware construction of the interface board is of less importance than the software construction, which is described below. Suitable hardware construction for the interface board can be found in the aforementioned U.S. Pat. No. 5,323,393 and the aforementioned Ser. No. 08/409,034. A block diagram of a suitable hardware construction for the interface board is shown in FIG. 2, in which reference numeral 10 designates generally an interface board such as interface board 101 and 119a. As shown in FIG. 2, interface board 10 includes a central processing unit (CPU) 11 such as an Intel 80C188EA-20 8-bit programmable microprocessor, which is interfaced to computer bus 12. Also interfaced to computer bus 12 is non-volatile RAM (NVRAM) 14, dynamic RAM (DRAM) 15, electrically erasable programmable read only memory (EPROM) 16, drivers for LED indicators 17, and a serial interface 19 which includes both a transmit and a receive terminal. Configuration parameters and other important information that must be stored between power cycles are stored in NVRAM 14. Process steps for execution by microprocessor 11 are stored in EPROM 16, but in general before the process steps are executed, they are copied from EPROM 16 into DRAM 15 for execution out of DRAM 15. LED indicators 17 are provided so as to give a user a general indication as to the processing status of interface board 10 and may, for example, include indicator LEDs for power and data communication. Serial interface 19 is provided so as to allow local serial access to interface board 10, such as in the aforementioned Ser. No. 08/336,102, "Low-Cost Serial Port".

As mentioned previously, interface board 10 interfaces between the local area network and the peripheral, and is therefore usually provided with a connector 20 for connecting to the LAN as well as connector 21 for connecting to the peripheral. A network interface controller 22, which is connected to bus 12 and to network connector 20, provides hardware interface for capturing and assembling data packets for receipt from and transmission onto the LAN, and also provides a hardware interrupt to microprocessor 11 so as to signal that LAN data packets have been captured and are available for use by the microprocessor. Static RAM (SRAM) 24 is provided for network interface controller 22 so as to store, on a temporary basis, such data packets.

On the peripheral side, a peripheral interface controller 25, which is connected to bus 12 and peripheral connector 21, provides peripheral interface between interface board 10 and the peripheral serviced by interface board 10. Peripheral interface controller 25 may be any of a variety of different controllers and can, for example, be constructed in a bi-directional interface (such as with a SCSI interface, an IEEE-1284 interface, a dual port RAM interface, a shared RAM interface, and the like) or a uni-directional interface (such as a standard Centronix RS232 interface or the like). Peripheral interface controller 25 is provided with SRAM 26 for temporary storage of data transmitted to and from interface board 10 and the peripheral serviced by interface board 10.

Figure 3:
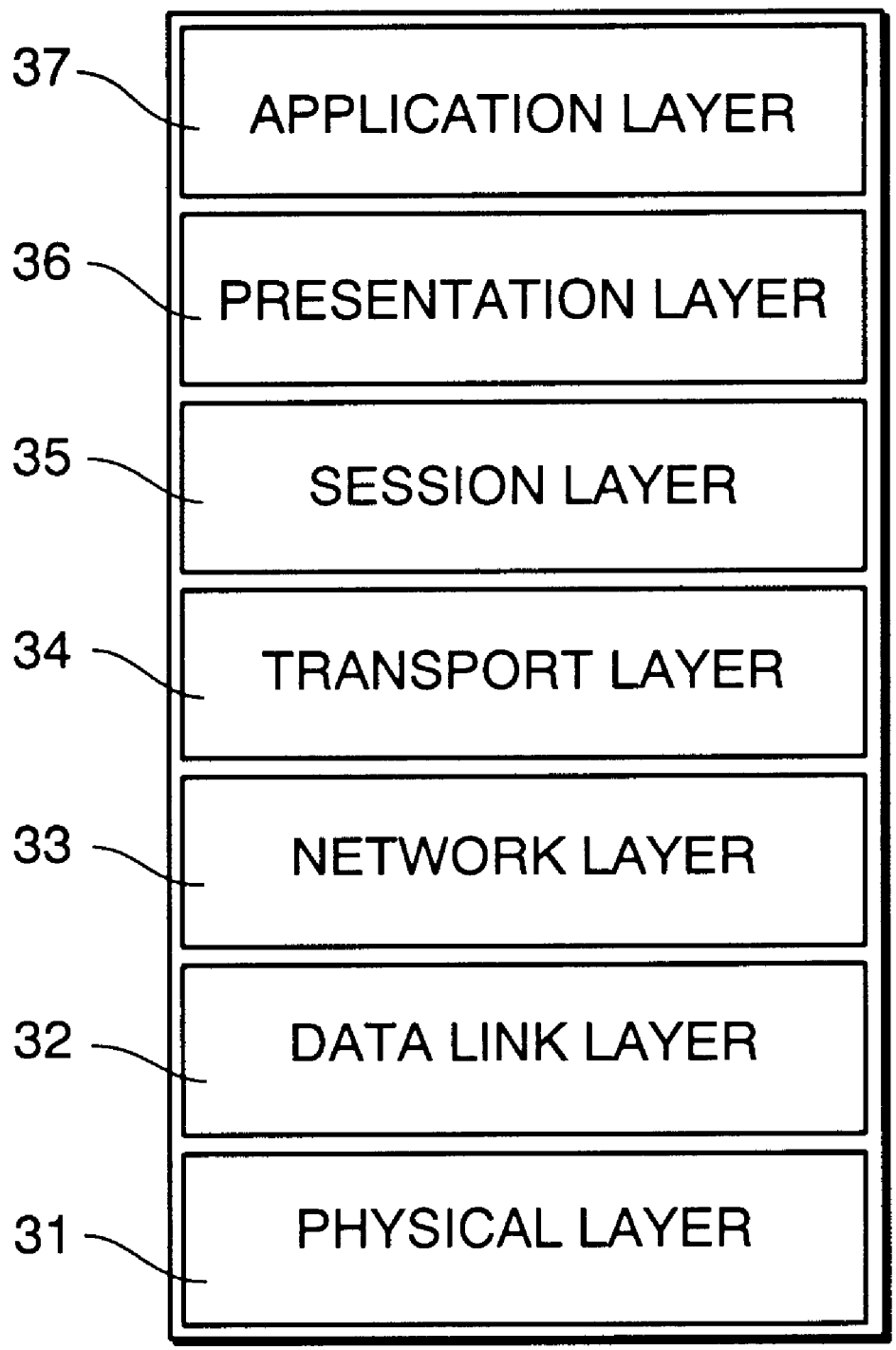
FIG. 3 is a view for explaining the ISO-OSI seven layer network model.

Each interface board communicates to the local area network through software architecture designed after the well-known ISO-OSI seven layer network model. FIG. 3 shows the seven layers which are, in ascending order: physical, data link, network, transport, session, presentation and application. In more detail, physical layer 31 sends raw bits of data over the physical LAN medium via LAN connector 20. In the embodiment herein, the physical layer is contained in network interface controller 22. This layer is specific to the type of network (such as Ethernet, Arcnet, Token Ring, and the like) and the type of cable over which the network communicates (such as coax, shielded twisted pair, and unshielded twisted pair).

Data link layer 32 converts raw bits to and from packets of data. Data link layer 32 is executed by microprocessor 11 in response to the hardware interrupt generated by physical layer 31. Generally speaking, data link layer 32 is executed in an interrupt-disabled state, meaning that further interrupts are not responded to until after execution of data link layer 32 has been completed. Any error checking on the data packets over the network is also performed in this layer.

Network layer 33 manages network traffic by translating logical network addresses to/from physical network addresses. Network layer 33 also determines what network path each data packet takes.

Transport layer 34 converts data to and from packets. This layer also manages errors and determines how to recover from them. Transport layer 34 also is responsible for sending an acknowledgement, for each packet received, back to the sender of the packet.

Session layer 35 manages a channel of information connecting an application that is running on two different nodes simultaneously.

Presentation layer 36 converts data to/from a convenient form for sending over the network. The presentation layer thus can provide for encryption, compression, as well as rules for how data will be transferred over the network.

Finally, application layer 37 supports applications that need access to network services. These services would include file transfers, database access and electronic mail, but in the interface boards described herein, the application layer is primarily reserved for PSERVER operations, RPRINTER operations, and socket monitoring operations, as described more fully below.

FIG. 4 is an example of how well-known networks fit into the seven layer ISO-OSI seven layer model. Thus, for Novell NetWare software versions 2.x and 3.x, the data link, network and transport layers are comprised by an IPX module, the session module is comprised by an SPX module, and the presentation layer is provided by a NETX module. In later versions of the software, the data link layer is divided into two sub-layers: a logical link control (LLC) sub-layer and a media access control (MAC) sub-layer. The MAC sub-layer of the data link layer maintains the interrupt-driven aspects of data link layer 32, which are described above, while the LLC sub-layer now responds to software output of the MAC layer, but not in an interrupt-disabled state as in the LLC sub-layer. Specifically referring to FIG. 4, for Novell NetWare version 4.x, the data link layer is comprised by the MLID module (for the MAC sub-layer) and the LSL module (for the LLC sub-layer), the network and transport layers are comprised by the IPX module, the session layer is comprised by the SPX module, and the presentation layer is comprised by the VLM module. For UNIX TCP/IP executing over Novell NetWare, the data link layer is comprised by the MLID module (for the MAC sub-layer) and the LSL module (for the LLC sub-layer), the network and transport layers are comprised by the IP module, the session layer is comprised by the TCP module, and the presentation layer is comprised by the Socket Interface module. For TCP/IP not being executed over Novell NetWare, the MAC sub-layer of the data link layer is comprised by a packet driver, the LLC sub-layer as well as the network and transport layers are comprised by the IP module, the session layer is comprised by the TCP module, and the presentation layer is comprised by the Socket Interface module.

Figure 5:
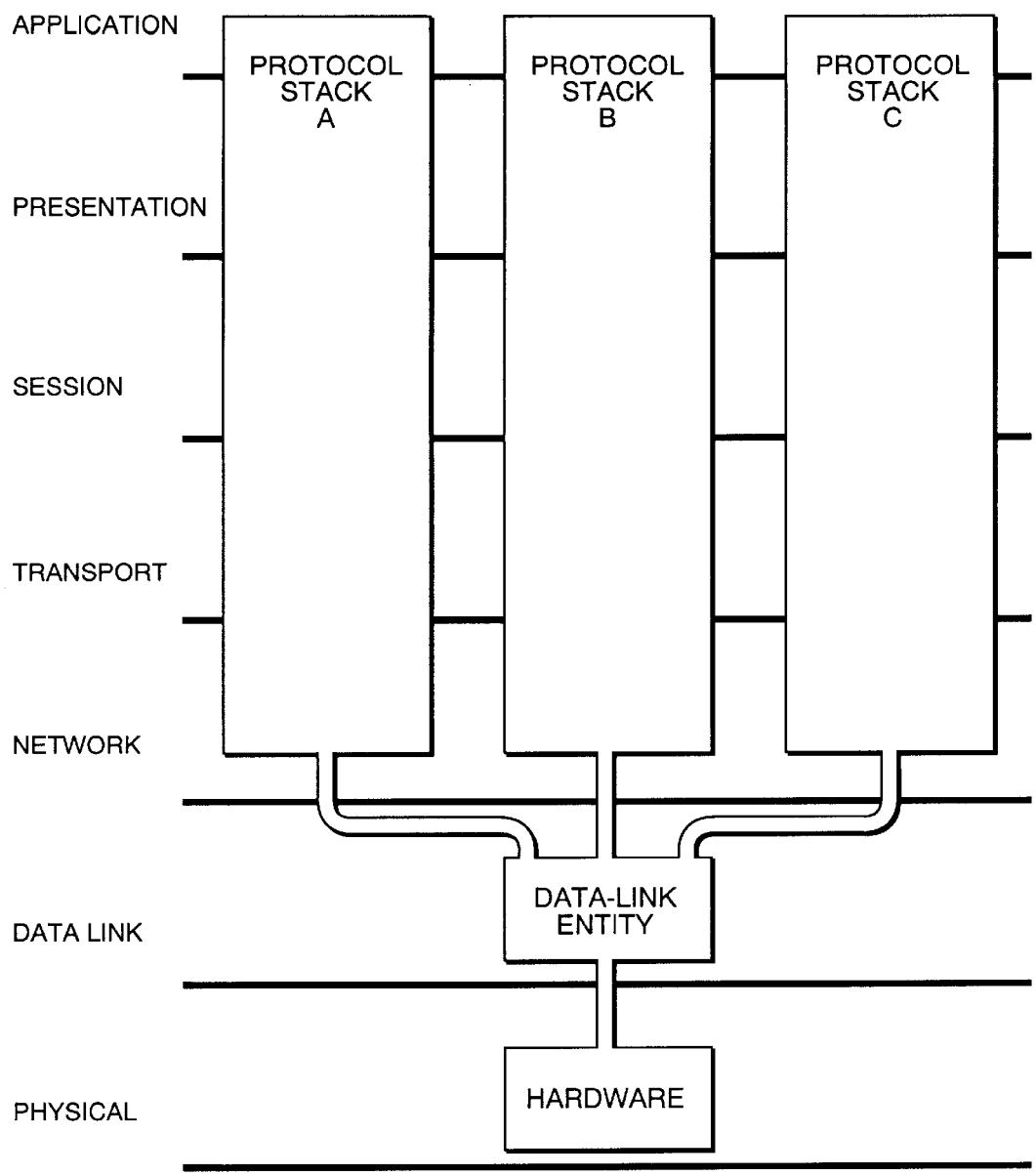
FIG. 5 is a view for explaining multiple protocol stacks.

The foregoing FIG. 4 is provided for illustrative purposes of some well-known network communication techniques, and is not meant to be exclusive. For example, Microsoft has introduced network communication software which is comprised by an NDIS driver at the data link layer followed by PROTMAN at the network layer; and Apple has introduced network communication software which includes a local access protocol (LAP) at the data link layer and datagram delivery protocol (DDP) at the network layer. It should here be noted that plural different "protocol stacks", which are comprised by the software modules at the network layer 33 up through the application layer 37, may sit on top of a single data link layer 32 so as to provide for several protocol stacks which are in simultaneous use from a single network node. FIG. 5 shows this arrangement in which several different protocol stacks (for instance SPX/IPX, AppleTalk and TCP/IP) are all in simultaneous use on a single interface board. The interface board, which in this case is the network node, is connected to a single data link layer, and the packets of the different protocol families running in the node are all sent through this same data link module. Thus, a node can have multiple addresses, each of which is intelligible to one particular protocol family or data link.

Figure 6:
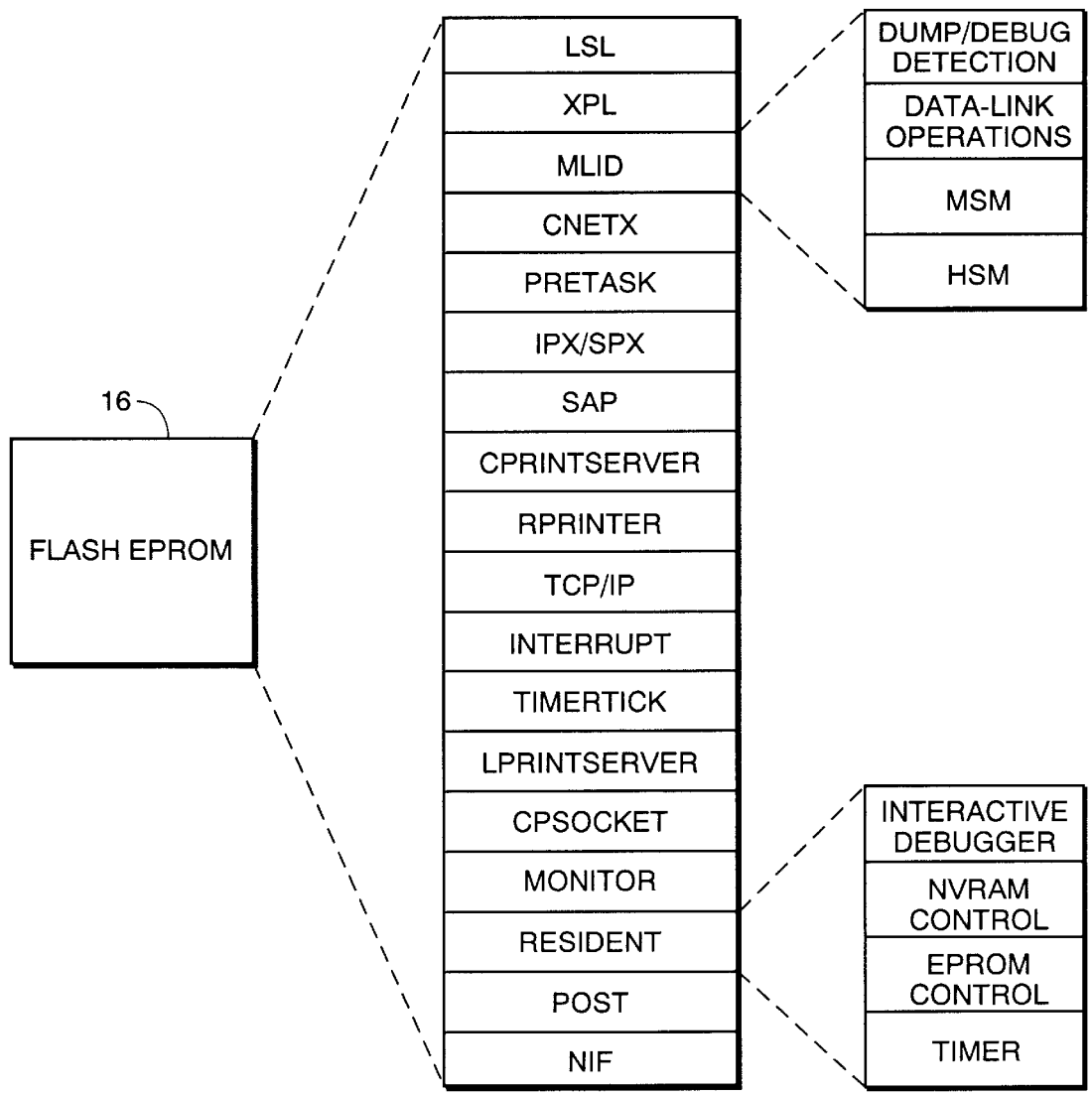
FIG. 6 is a view showing software modules stored in EPROM on a network interface board.

FIG. 6 is a view showing how software modules, including software modules which form the second layer ISO-OSI network layer, are arranged in interface board 10. Shown in FIG. 6 are the process steps which are stored in flash EPROM 16, and which are downloaded from flash EPROM 16 into DRAM 15 for execution by microprocessor 11. Thus, referring to FIG. 6, the XPL module provides process steps for a standardized interface between interface board 10 and its installed peripheral, such as printer 102 or copier/printer 118. The MLID (multi-link interface driver) module provides process steps which form the data link layer of interface board 10. As mentioned previously, MLID controls communication between the LAN and the next upward layer (i.e., network layer 33) of the ISO-OSI network model. MLID is comprised by at least two parts: the media support module (MSM) and the hardware specific module (HSM). MSM is source code provided by Novell which implements standard functions of LAN drivers into an open data link interface (ODI) for each of the standard media types. HSM is process steps which perform steps specifically designed for the hardware-specific aspects of interface board 10. According to the present invention, MLID also includes dump/debug detection process steps which are described in more detail below in connection with FIG. 7.

The LSL (link support layer) module includes process steps that act as a multiplexer between the low-level MLID and the various protocol stacks loaded above LSL. Thus, LSL is the factor that allows a single driver to support multiple protocols and for a protocol to use multiple drivers. When LSL receives a packet of data from MLID, LSL acts a switchboard by determining which protocol stack should receive the packet. Thus, LSL eliminates the need to write separate drivers for each frame and/or protocol combination, thereby dramatically reducing the number of drivers needed by interface board 10.

The CNetX module provides process steps that turns local DOS-like function calls into network function calls, thereby providing file functions like open, read, write and close.

The pretask module provides process steps responsible for identifying what frame types are associated with the various protocol stacks, so as to load appropriate protocol stacks on top of LSL.

The IPX/SPX module includes process steps providing an IPX/SPX protocol stack, and which also provides for service advertising protocol (SAP). In this regard, the SAP module are process steps that allows devices to register themselves with a file server, or into a file server's bindery, which maintains lists of active and inactive entities. Because print servers are a special kind of entity, SAP registers interface board 10 via CPSOCKET (which is described below) and also registers interface 10 as a print server.

CPRINTSERVER is a custom implementation of a Novell print server application This module provides process steps which generate print banners, user notification of completion and exception status, and transmission of print data and status commands to the print engine via peripheral interface 25. CPRINTSERVER differs from the Novell PSERVER in that CPRINTSERVER is dedicated to driving a single printer that is connected to peripheral connector 21 and cannot drive any remote RPRINTERS. CPRINTSERVER owns the print data channel for the duration for a print job.

The RPRINTER module is a custom implementation of a standard Novell RPRINTER print application, and allows interface board 10 to serve as a slave application which is sent print data by another Novell PSERVER elsewhere on network 100.

The TCP/IP module provides process steps for a protocol stack that has user datagram protocol (UDP), reverse address resolution protocol (RARP) and bootp.

The INTERRUPT module provides for an interrupt handler for the TCP/IP task, while TIMERTICK is the TIMERTICK for UNIX TCP/IP network tasks. LPRINTSERVER is a TCP/IP print server application, and also owns the print data channel for the duration of a TCP/IP-generated print job.

The CPSOCKET module provides process steps which run all protocol stacks installed on top of LSL. The module responds to requests for connection, requests for data download, or requests for services from remote utilities, and provides status and control to other tasks via inter-process communication. Because CPSOCKET typically owns the status and control channel between interface board 10 and its installed peripheral, it is the only task that has the ability to obtain printer status via the status channel. CPSOCKET is responsible for the network connection and packet contents between Novell-oriented status and control utilities (CPNET) or between the UNIX-oriented status and control utilities (cpnet).

The monitor module provides process steps for a customized multi-tasking non-preemptive monitor which performs task creation, task destruction, and microprocessor dispatch. Monitor also has memory management and sub-modules MEMGET and MEMFREE.

The RESIDENT module provides process steps for routines that provide generic services. As shown in FIG. 6, RESIDENT includes at least an interactive debugger, which is described in more detail below, as well as control modules for reading and writing contents of NVRAM, control modules for re-programming of EPROM 16, hardware timer tick and other basic features.

The POST module provides process steps for power-on-self-test which checks integrity of interface board hardware and software at power-up.

Finally, EPROM 16 includes a network identification file (NIF) block which stores board-invariant functions such as media access control address which is unique for every network board, hardware configuration, board version number, and the like.

[Responding to Dump/Debug Data Packets]

Figure 7:
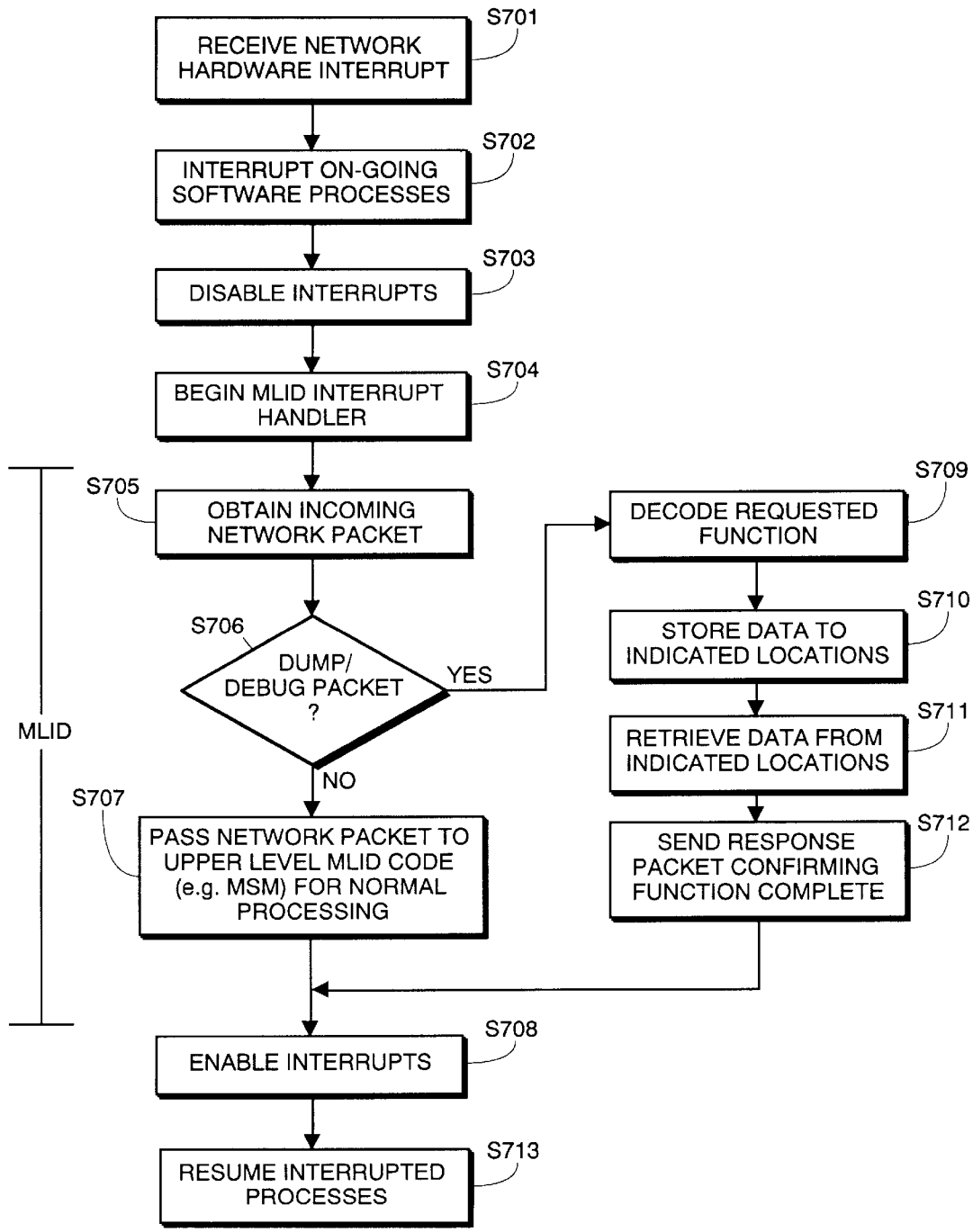
FIG. 7 is a flow diagram for explaining process stops for an interrupt-driven software module at the data link layer.

FIG. 7 is a flow diagram for explaining process steps performed by microprocessor 11 in response to a hardware interrupt, from network interface controller 22, signifying that a data packet has been received from the local area network and is ready for processing. The process steps shown in FIG. 7 are stored in flash EPROM 16, primarily in the MLID module, as indicated in FIG. 6, and are executed by microprocessor 11 from DRAM 15 after the POST module downloads the process steps from EPROM 16 to DRAM 15.

Briefly, the process steps in FIG. 7 show processing by which an interrupt-driven data link layer, in an interrupt-disabled state, responds to the dump/debug network packets so as to cause desired dump and/or debug facilities to be executed. The data link layer is included on an interface board which includes a protocol stack which extends from a physical network layer, through the interrupt-driven data link layer, to an application layer which services a network peripheral. The data link layer is triggered by a unique dump/debug packet header and interprets proprietary debug commands stored in the data portion of the packet so as to execute the dump/debug commands in an interrupt-disabled state. The dump/debug commands may include commands to dump some or all of memory of the network device, and may include commands to store data in the packet to specific locations of memory of the network device. Storage of some predetermined pieces of data may, in turn, cause the network device to enter into debug modes of operation, such as storage of data which causes a subsequent break-in into an interactive debug mode. Results of the dump and/or debug facilities are then transmitted from the interface board, back across the LAN, to the workstation from which the request was initially issued.

In more detail, after receiving a network hardware interrupt from network interface controller 22 (step S701), microprocessor 11 interrupts on-going software processes (step S702). Those interrupted software processes may, for example, include servicing of a current print job, status inquiries to the installed peripheral, and the like. In step S703, microprocessor 11 disables interrupts so as to allow the MLID interrupt handler to begin execution (step S704).

In step S705, MLID obtains the incoming data packet from network interface controller 22. The packet is then inspected, in step S706, to determine if the packet is a dump/debug packet. In the present embodiment, to qualify as a dump/debug packet, the incoming packet must be recognizable as a non-broadcast-type IPX packet (i.e., either a multicast or specifically-addressed packet) addressed to a specific network reserved socket number which is monitored by the MLID module. As one example, the socket number may be hexadecimal 83B5.

If the incoming network packet is not a dump/debug packet, then flow advances to step S707 in which the incoming packet is passed to upper level MLID code (for example, the MSM module) for processing in the normal manner, whereafter flow advances to step S708 where interrupts are enabled.

On the other hand, if in step S706 a dump/debug packet was received, then before interrupts are enabled (i.e., in an interrupt-disabled mode), the dump/debug packet is processed entirely within the scope of the MLID interrupt handler. Thus, in step S709, the dump/debug packet is decoded so as to determine what dump/debug functions have been requested. Since the dump/debug functions are being processed entirely within the scope of a real-time interrupt handler, and so as to minimize the amount of program memory and time needed in that interrupt handler so as to permit on-going processes and further interrupts to be handled as quickly as possible, the dump/debug functions are normally kept at a rudimentary level. For example, in the present embodiment, two primary dump/debug functions are provided for, namely storage of data to indicated locations (step S710) and retrieval of data from indicated locations (step S711), although it will be appreciated that only one such dump/debug function will normally be requested in a single dump/debug packet. (Note that any location accessible by microprocessor 11 can be stored to or retrieved from, e.g., microprocessor registers, DRAM 15, interface controllers 22 and 25, and so on.) Other dump/debug functions such as suspend and resume execution are also provided for, as detailed below in connection with Table I.

After executing of the dump/debug function requested in the dump/debug packet, and still in an interrupt disabled state, the MLID interrupt handler sends a response packet (step S712) over the local area network to the requesting entity. The response packet may be a simple acknowledgement confirming that the requested dump/debug function is complete, or the response packet may contain data such as data retrieved in step S711.

Beyond the rudimentary functionality described above (namely, storage and retrieval of data, suspend and resume execution, and the other rudimentary functionality described below in Table I), more advanced functions, such as might be provided by an interactive debugger, are normally left to software modules executing on the workstation. For example, the function which sets a break point at a specified process step, with the purpose of causing subsequent initiation of the interactive debugger when the specified process step is reached, is executed primarily by workstation software and relies only on the capability of the MLID to retrieve and store data at indicated locations in the memory of the network interface controller 22.

After the dump/debug packet has been processed within the scope of the MLID interrupt handler, flow advances to step S708 in which interrupts are enabled. Thereafter, in step S713, microprocessor 11 resumes the processes that were interrupted at step S702.

Figure 8:
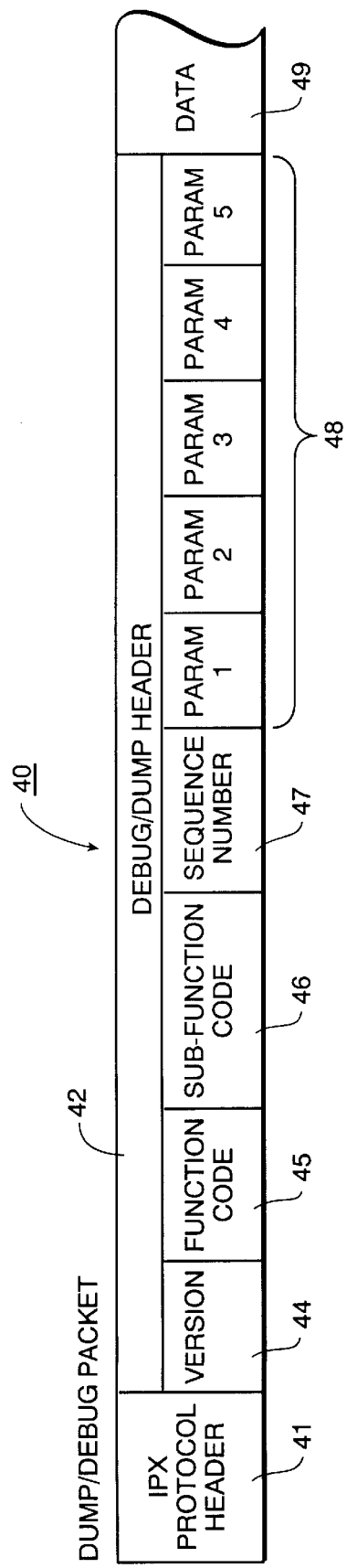
FIG. 8 is a view showing construction of a dump/debug data packet.

FIG. 8 shows the format of a typical dump/debug packet 40. An mentioned previously the dump/debug packet is identified by being a non-broadcast IPX packet addressed to a specifically-reserved socket number. Thus, dump/debug packet 40 includes an IPX protocol header 41. Immediately following IPX protocol header 41 is a dump/debug header 42 which includes a version identification 44, a function code 45, a subfunction code 46, a sequence number 47, and up to five parameters 48. Data 49, which typically can contain up to 1500 bytes of information such as code to be downloaded into DRAM 15 for execution by microprocessor 11 following the dump/debug header 41.

In more detail, version identification 44 contains the version identification of the workstation utility which sent the dump/debug packet 40 to interface board 10, as well as the version number of the enhanced MLID module, in the case where MLID is returning a dump/debug packet 40 to a workstation. Version identification 44 is provided so that future implementations and upgraded versions can determine whether a newer or older implementation is being communicated with.

Function code 45, as well as sub-function code 46, identifies the type of function requested. Function codes and sub-function codes are set forth in Table I below.

Sequence number 46 is used to verify the correspondence between request packets from a workstation and reply packets from interface board 10. Specifically, because the IPX communication protocol used by the dump/debug facility does not provide for guaranteed packet delivery, sequence number field 47 is used to verify that all requests have been responded to. Specifically, each time a workstation sends a dump/debug packet, it increments the sequence number for each new request packet. When a response is returned from interface board 10, the workstation checks the sequence number to determine whether there is equality between the request and the response. If, after a specified period of time, a suitable response has not been received, then the request is re-sent from the workstation with the same sequence number. Thus, even though the IPX communication protocol does not provide for guaranteed packet delivery, sequence number field 47 allows a workstation to determine that all generated requests have been responded to.

The five parameter fields 48 are used in connection with the function code 45 and sub-function bit 46, as discussed below in Table I.

Data 49 includes data sent from the workstation or returned from the interface board 10. For example, in a case where a workstation requests a memory dump, the interface board 10 will include in data section 49 the contents of the requested memory locations. Likewise, when a workstation sends data for loading in specific memory locations of interface board 10, data section 49 includes the data to be so downloaded.

Table I shows suitable values for function code 45 and sub-function code 46:

TABLE I

Dump/Debug Function Codes

| Function Code | Sub-Function Code | Action |
|---|---|---|
| 0 - CONNECT | 0 | Close Connection |
|  | 1 | Open Connection |
| 1 - STOP | X | Suspend Execution |
| 2 - GO | X | Resume Execution |
| 3 - DUMP_DATA | X | Read memory-Send data |
| 4 - ENTER_DATA | X | Receive data-Write to memory |
| 5 - INPUT_PORT | 0 | Read byte I/O port-Send data |
|  | 1 | Read word I/O port-Send data |
| 6 - OUTPUT_PORT | 0 | Receive data-Write to byte port |
|  | 1 | Receive data-Write to word port |
| 7 - CONIO | 0 | Receive data-Deliver as standard input |
|  | 1 | Accept standard output-Send data |

Thus, the Open Connection function will establish a connection between the requesting workstation and interface board 10. The MLID stores the network address of the requesting workstation as the destination address for all subsequent communication. In addition, four interrupt vectors are installed for interrupts 01h, 03h, 10h and 16h. Interrupts 01h and 03h will support "single step" and "go with breakpoints". Interrupts 10h and 16h serve as standard output and standard input for all programs executing on the interface board and are thus "redirected to the network". While the MLID is "connected" to a particular workstation, any DUMP/DEBUG packets arriving from a different workstation will be ignored.

The Close Connection function reverses the effect of Open Connection. The four interrupt vectors are restored to the values they held prior to the "connect" and the MLID is placed in the "unconnected" state. A response packet is sent.

The Suspend Execution function (STOP) places the MLID in the "stopped" state. While in this state, exit from the scope of the MLID's interrupt handler is blocked. In this state, additional request packets can be received, acted upon and acknowledged, but for all practical purposes, other activity ceases because the interrupt handler executes with interrupts disabled. A response packet containing the current value of the stack pointer in parameter 2 (in the format SS:SP-LSB first) is sent.

The Resume Execution function (GO) removes the MLID from the "stopped" state, sends a response packet and exits from the interrupt handler, resuming normal execution.

The Dump Data function will contain a start Address (in the format seg:offset-LSB first) in parameter 2 and a Requested Byte Count in parameter 1. The response packet will contain the requested data (as binary byte values) appended after the Debug Header. The Dump Data request is used after a Suspend Execution to read the stack frame containing the register values which were saved by the MLID on enter to the interrupt handler (in a well-known order). Dump Data is also used to display the memory contents of interface board 10 in hexadecimal, ASCII or unassembled format. Dump Data retrieves interface board memory contents for storage in a "dump" file.

The Enter Data function will contain a Start Address (in the format seg:offset-LSB first) in parameter 2, a Requested Byte Count in parameter 1, and a sequence of binary byte values following the Debug Header. The MLID transfers the byte values to the specified area. Enter Data is used to modify data values, to modify process steps, to set break points for subsequent initiation of execution of the interactive debugger, and to modify the stack frame, so as to implement register modification and single-step (by setting the "trace" bit in the FLAGS image). A response packet is sent.

The Input Port function will contain a port address in parameter 1. The MLID will execute a byte "in" (sub-function 0) or a word "in" (sub-function 1) and return the value read in the response packet in parameter 4 (byte) or in parameter 3 (word).

The Output Port function will contain a port address in parameter 1 and a value in parameter 4 (for a byte) or parameter 3 (for a word). The MLID will execute a byte or word "out" of the specified value and send a response packet.

The Standard Input function (CONIO-0) is used by the workstation to send one byte of input data to a program executing on the interface board. The value is passed in parameter 5. The MLID places the byte in a circular input buffer and delivers it at the next call of INT 16h. No acknowledge packet is sent. No flow control mechanism is provided since the intended use is to send keyboard input typed at the "connected" workstation to some application running on the interface board. Most typically, the keyboard input typed at the connected workstation is sent to the interactive debugger on interface board 10.

The Standard Output function (CONIO-1) is used by the MLID to send one byte of output data sent from an executing program via TNT 10h to a "connected" workstation where it typically will be presented to the workstation operator on the workstation display. No acknowledge packet is sent. After sending 10 bytes of data via Standard Output, the MLID places itself in the "output blocked" state where it will remain until a Standard Input packet is received containing an "XON" byte (11h).

Receipt of an "XOFF" byte (13h) also "blocks" standard Output. The "output blocked" state is used to prevent a stream of Standard Output characters from overrunning the workstation's ability to handle them.

[Network Workstations]

Figure 9:
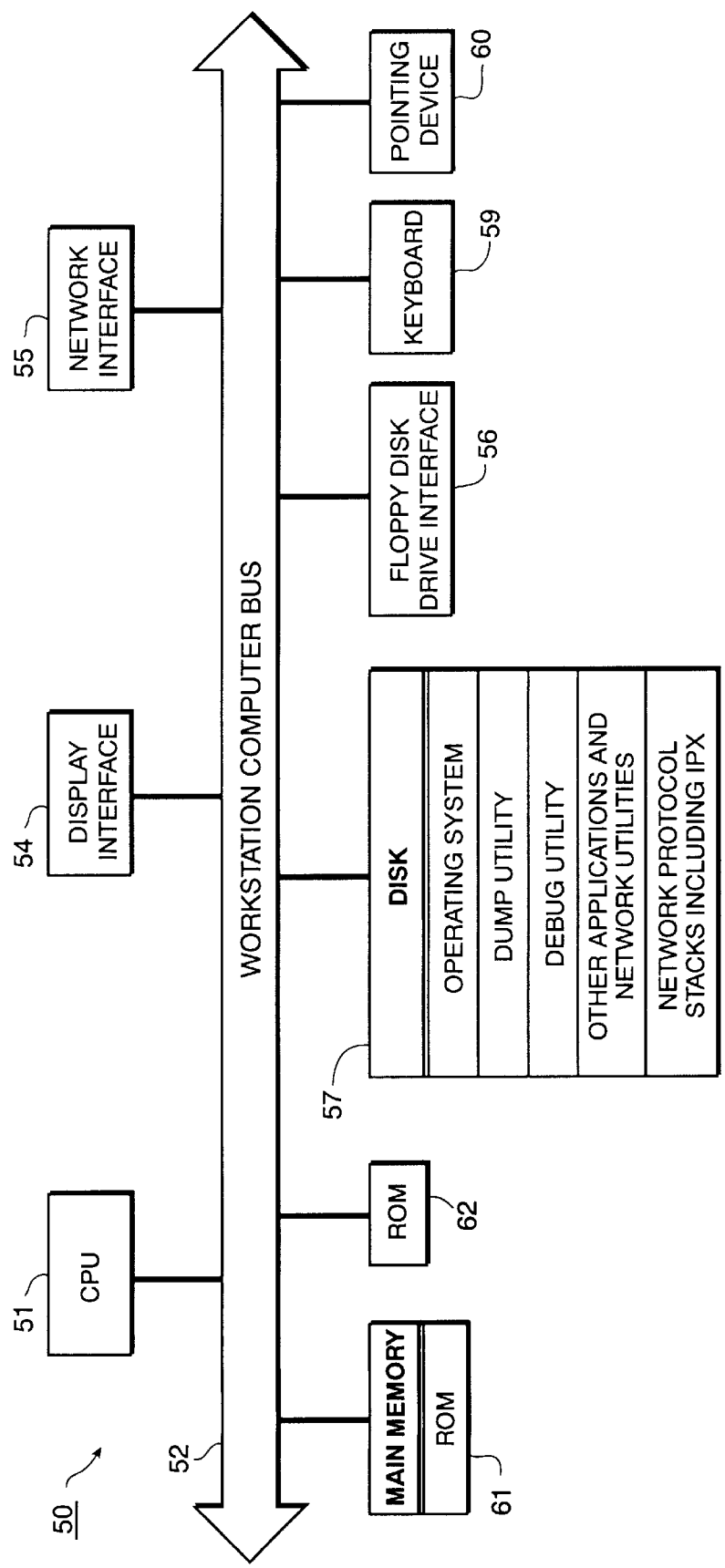
FIG. 9 is a block diagram showing construction of a workstation on a local area network.

FIG. 9 is a block diagram showing a generalized structure of a workstation connected to the LAN, such as workstation 103, 104, 11, 112, 121 or 122. These workstations form the platforms from which dump and debug utility programs are launched and interact with selected ones of interface boards installed on the network. Accordingly, the hardware construction of the workstation is less important than the software organization of the dump and debug utility programs.

Thus, FIG. 9 shows only a general construction of a workstation 50, which, as mentioned above, may be any workstation on the LAN or WAN. Shown in FIG. 9 is a central processing unit 51 such as an Intel 80486 or Pentium processor, interfaced to a workstation computer bus 52. Also interfaced to workstation computer bus 52 is a display interface 54, a network interface 55 for interfacing to the local area network, a floppy disk drive interface 56 by which software is installed to hard disk drive 57, a keyboard 59, and a pointing device 60 such as a mouse or the like.

Main memory 61 which has random access memory (RAM) interfaces to computer bus 52 so as to provide CPU 51 with access to memory storage. In particular, when executing stored application program instruction sequences such as the dump and debug utilities stored on disk 57, CPU 51 loads those instruction sequences from disk 57 (or other storage media such as media accessed from the network via network interface 55) into main memory 61 and executes those stored program instruction sequences out of main memory. ROM 62 is provided for storing invariant instruction sequences such as a start-up instruction sequence for basic input/output operating system (BIOS) sequence for operation of keyboard 59 and the like.

As shown in FIG. 9, and as previously mentioned, fixed disk 57 stores program instruction sequences for an operating system, such as a windowing or DOS operating system, and for various unshown application programs. In addition, stored on fixed disk 57 are two utility programs, a dump utility program and a debug utility program. In a preferred embodiment, both the dump and debug utility programs are small "C" programs linked in DOS .exe format. They communicate with selected interface boards on the network by sending and receiving IPX packets. The frame type used for those packets is determined by the contents of a net.cfg file which is also resident, though unshown, on disk 57. If the network includes bridges or routers configured to convey IPX/SPX packets of the specified frame type, as is the case in FIG. 1, then the dump and debug utility programs are able to access interface boards located on networks other than the network to which the workstation 50 is attached.

The dump utility program provides a means to identify all interface boards accessible from workstation 50, to connect with a selected one of the interface boards, and to request transfer of one or more portions of the interface board's memory to disk 57 on workstation 50. These "dump" files represent snapshots of interface board activity and can be examined subsequently using standard workstation utilities to diagnose problems or otherwise examine the internal operation of the interface board.

The debug utility also provides a means to identify all active interface boards accessible from workstation 50 and to connect with a selected one of the interface boards. An "asynchronous break-in" can also be requested, by entering a predetermined character such as an exclamation point (!) which causes a Suspend Execution dump/debug packet to be sent to the connected interface board, at which point execution on the interface board will be suspended as described previously, with the exception of whatever activity is required to communicate between the interface board and the workstation. Through the debug utility, a user can examine or modify interface board process registers, memories, and peripheral registers. Execution can be resumed, either one instruction at a time (i.e., trace or single step mode) or at full speed with optional break points set. If the interface board processor arrives at a program location for which a break point was established, execution is thereafter again suspended.

After the debug utility has "connected" to an interface board, any debug print output which is normally directed to serial interface 19 on the interface board is instead redirected to workstation 50 via the network and displayed through display interface 54. Any characters typed at the workstation keyboard will be sent to the connected interface board where they will be seen by the interface board as serial input and interpreted by the interface board accordingly. In addition, test programs can be downloaded via the network and executed by the interface board microprocessor 11. If the test program executes standard input or output routine, data will automatically be directed to workstation 50, enabling the user to interact directly with the test program.

Thus, the dump and the debug utilities have different capabilities, which are described in more detail below in appropriate sections. At the same time, both the dump and debug utilities have a certain degree of commonality, both of function and appearance. For example, both dump and debug utilities are designed to execute on workstation 50 in either a DOS environment or in a "DOS box" in a windowing environment. Both utilities access the network via the Novell IPX/SPX protocol stack which must be present and active. Note that it is not a requirement for workstation 50 to be logged into a Novell file server, and, in fact, both utilities will function correctly even when attached to a network which does not include a Novell file server.

Figure 10:
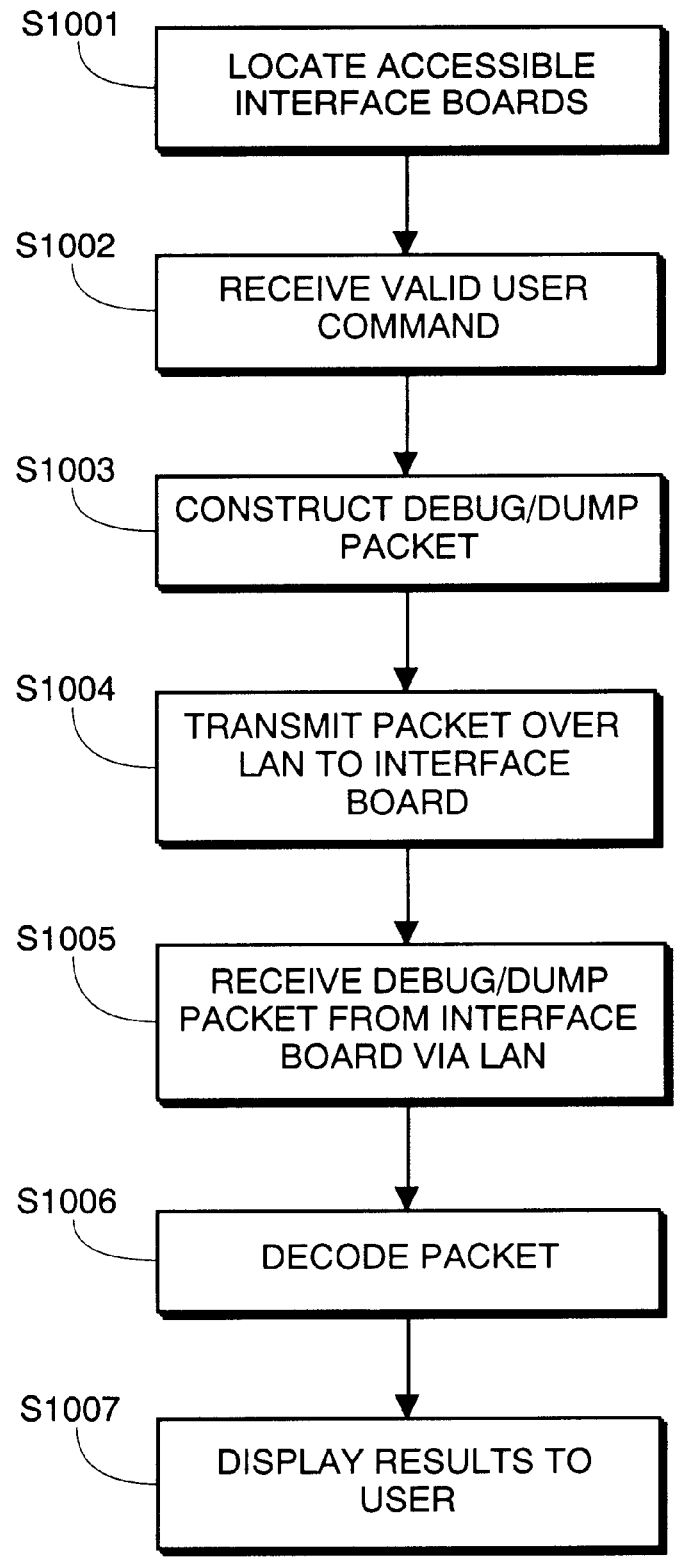
FIG. 10 is a flow diagram for explaining dump and debug utilities on a workstation.

FIG. 10 is a flow diagram showing, in general, common operations of both the dump and debug utilities from workstation 50. Briefly, a dump and/or debug utility is provided on a workstation of a local area network to which is also connected an interface board for a network peripheral, the utility including a user interface for accepting user-originating dump commands, process steps for constructing a dump/debug network packet containing dump/debug commands in accordance with user-originated commands, process steps to send the dump/debug packet across the LAN to the interface board, process steps to receive a dump/debug packet originating from the interface board via the LAN, and process steps to display dump/debug results to the user.

In more detail, in step S1001, the dump or debug utility locates any accessible interface boards on the network. If a Novell NetWare shell (for example, NetX or VLM) is active in the workstation and a Novell file server is accessible via the network, the Novell NetWare "scan bindery" facility is preferably used to locate and display network addresses of accessible interface boards with active IPX protocol stacks. If a NetWare shell is not available, locating accessible interface boards in accordance with step S1001 is accomplished through a SAP query which is used to locate interface boards.

Flow then advances to step S1002 in which a valid user command is received, for example, via keyboard 59 on workstation 50. The dump or debug utility constructs an appropriate dump/debug data packet (step S1003), as discussed above in accordance with FIG. 8, and transmits the data packet over the LAN to appropriate interface board (step S1004). The interface board processes the dump/debug packet as discussed above, constructs an appropriate debug/dump response packet, and transmits the response packet back onto the LAN. In step S1005, workstation 50 receives the dump/debug packet from the interface board via the LAN, in step S1006 workstation 50 decodes the packet, and in step S1007 results are displayed to the user or, in the case of a memory dump, stored to a file on disk 57.

Specific implementations of the dump and the debug utilities are described below.

[Dump Utility from a LAN Workstation]

Figure 11:
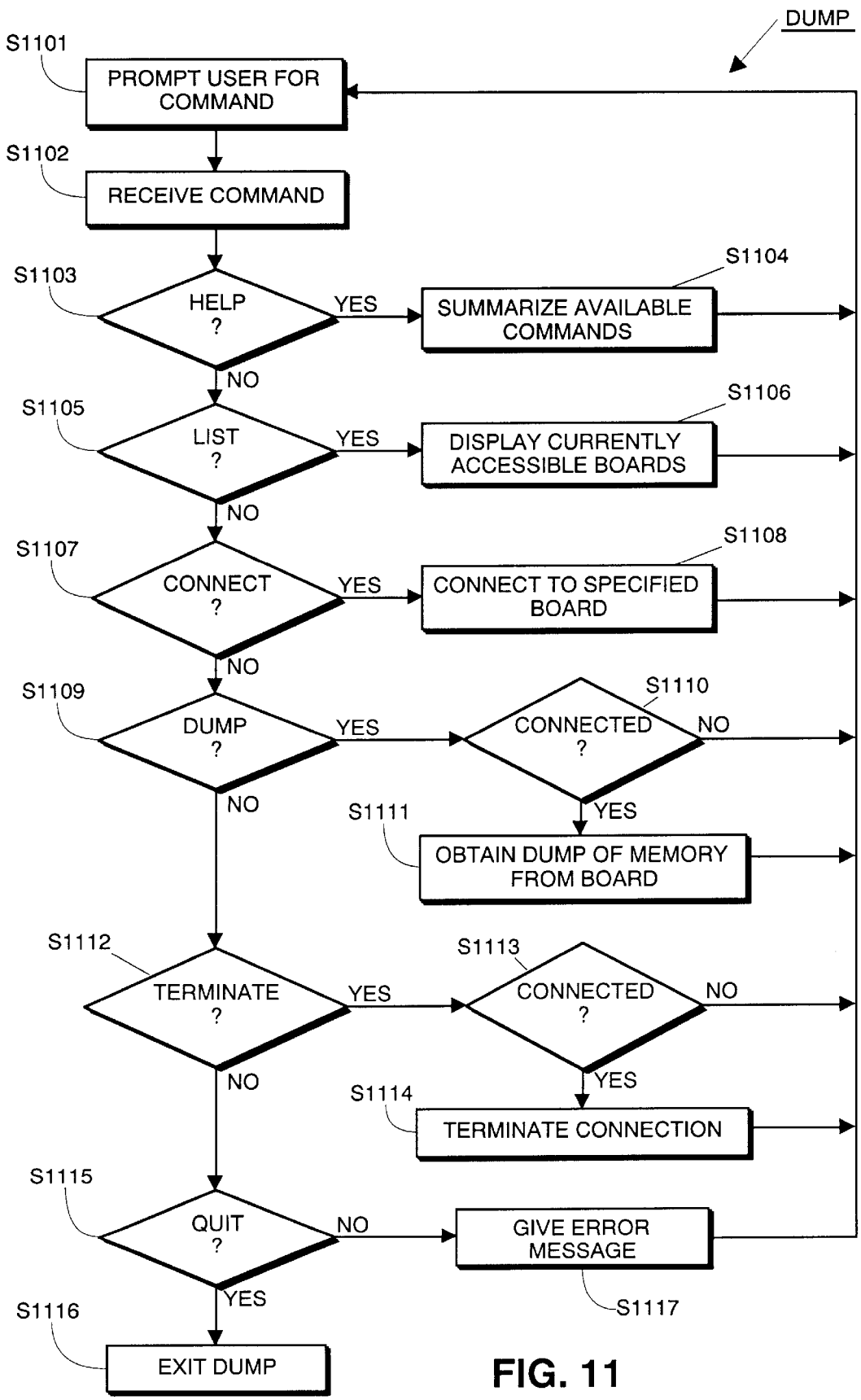
FIG. 11 is a flow diagram showing dump command processing.

FIG. 11 is a flow diagram of the Dump utility program which is invoked on workstation 50 from the DOS command prompt by typing "cpdump". The version number is displayed and a command line prompt:

CPDump:

is issued (step S1101). At this point, the user may enter a command (step S1102). Commands and their operands are not case-sensitive (i.e., they may be entered in either upper or lower case). The backspace key may be used to correct typing errors. Commands are acted upon only after the terminating "Enter" key is pressed. Supported commands include the following:

? (help)
L (list)
C (connect) {netaddr>|#<seq>}
D (dump) <addr> {<ww>|L <ww>}
T (terminate)
Q (quit)

where:
  <netaddr> is either <netnum>:<macaddr> or <macaddr>;
  <netnum> is a one- to eight-digit hexadecimal network number;
  <macaddr> is a one- to twelve-digit hexadecimal MAC address;
  <seq> is a one- or two-digit decimal sequence number as displayed by the 'L' command;
  <addr> is a memory address: <ww>:<ww> or <dd>;
  <ww> is a one- to four-digit hexadecimal value; and
  <dd> is a one- to five-digit hexadecimal value.

In the foregoing command descriptions and the command descriptions which follow, the following conventions are used:

1) Items not enclosed in angle brackets should be entered as they appear in the description.
2) Items enclosed in angle brackets are further defined in a subsequent line.
3) Items enclosed in square brackets are optional items. If two or more items appear, separated by a vertical bar, none or one of the items should be entered. Square brackets and vertical bars should not be entered as part of a command.
4) Items enclosed in braces are required items. If two or more items appear, separated by a vertical bar, one of the items must be entered. Braces and vertical bars should not be entered as part of a command.
5) An ellipsis (three dots) following an item means that the preceding item may be repeated zero or more times. The ellipsis should not be entered as part of the command.

A detailed description of the above commands follows. In assembling dump/debug packets to carry out execution of these commands, sequence numbering of field 47 in the dump/debug packet is incremented, as described previously, so as to ensure correlation between a request from workstation 50 and a response from interface board 10.

The ? (help) command (steps S1103 and S1104) displays a brief version of the available commands.

The L (list) command (steps S1105 and S1106) may be used to display the network addresses of all of the currently accessible interface boards with active IPX protocol stacks. The displayed list will be numbered sequentially. The sequence number may be used in the operand of the "connect" command.

The C (connect) command (S1107) will assemble a dump/debug packet designed to establish a connection between the workstation and the specified interface board (S1108). The user will be informed as to the success or failure of the attempt. If <netnum> is not specified, the "connect" attempt is made on the local network. If #<seq> is specified, the "connect" operation will use the <netnum>:<macaddress> displayed on the corresponding line of the most recent "list" display.

The D (dump) command (S11O9) may only be issued after a successful "connect", which is checked in step S1110. In response to the dump command, workstation 50 assembles a dump/debug packet that specifies an area of memory on the interface board. Interface board execution will be suspended during the transfer of the contents of the specified memory area. The user will be prompted to enter a file specification for the file which will contain the "dumped" data. Note that each "dump" command will create a separate "dump" file (S1111).

The T (terminate connection) command (steps S1112, S1113 and S1114) disconnects the workstation from the currently "connected" interface board.

The Q (quit) command (S1115 and S1116) terminates any established connection and exits the dump utility.

[Debug Utility from LAN Workstation]

Figure 12A:
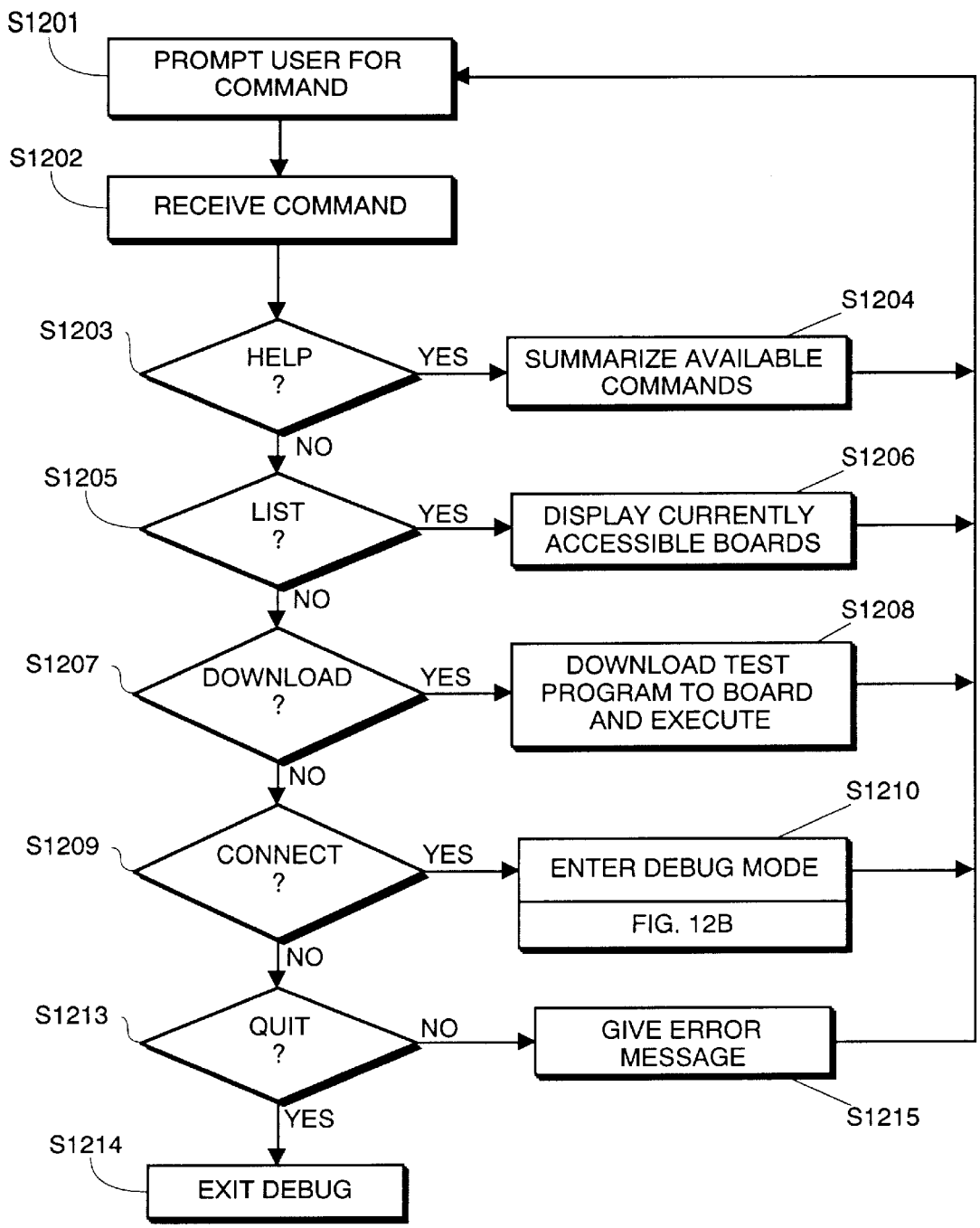
FIGS. 12(a) and 12(b) are flow diagrams showing debug command processing.
Figure 12B:
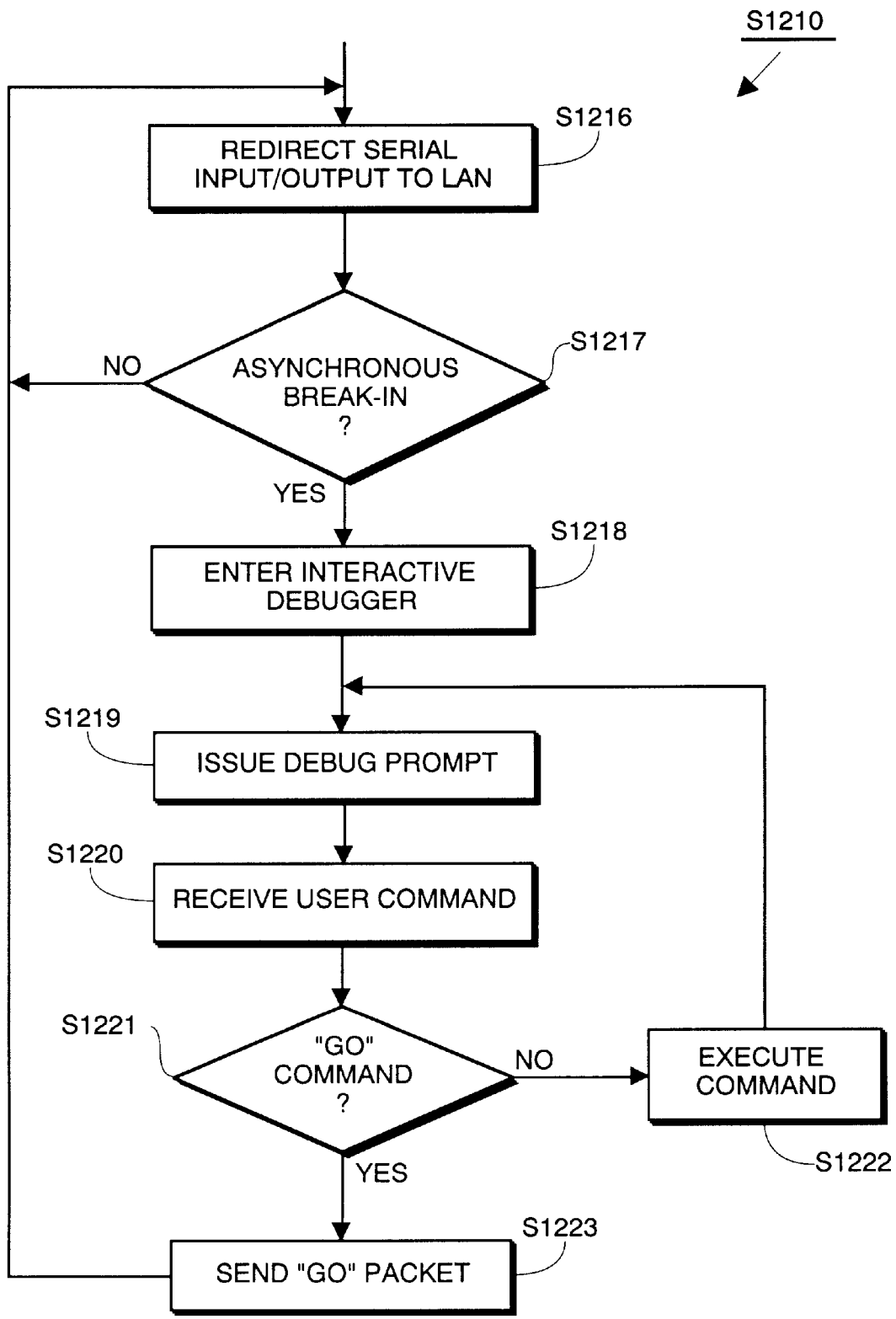

FIGS. 12A and 12B together are a flow diagram of the Debug utility program which is invoked on workstation 50 from the DOS command prompt by typing "cpdebug". The version number is displayed and a command line prompt:

CpDebug:

is issued (step S1201). At this point, the user may enter a command (step S1102). Commands and their operands are not case-sensitive (i.e., they may be entered in either upper or lower case). The backspace key may be used to correct typing errors. Commands are acted upon only after the terminating "Enter" key is pressed. Supported commands include the following:

? (help)
L (list)
D (download) {<netaddr>|#<seq>} <prog>
C (connect) {netaddr>|#<seq>}
Q (quit)

where:

<nedaddr> is either <netnum>:<macaddr> or <macaddr>;
<netnum> is a one- to eight-digit hexadecimal network number;
<macaddr> is a one- to twelve-digit hexadecimal MAC address;
<seq> is a one- or two-digit decimal sequence number as displayed by the 'L' command;
<prog> is a file specification for a downloadable test program.

A detailed description of the above commands follows. In assembling dump/debug packets to carry out execution of these commands, sequence numbering of field 47 in the dump/debug packet is incremented, as described previously, so as to ensure correlation between a request from workstation 50 and a response from interface board 10.

The ? (help) command (S1203 and S1204) displays a brief version of the available commands.

The L (list) command (steps S1205 and S1206) may be used to display the network addresses of all of the currently accessible interface boards with active IPX protocol stacks. The displayed list will be numbered sequentially. The sequence number may be used in the operand of the "connect" command.

The D (download test program) command (S1207 and S1208) specifies the name of an executable test program to be read, and assembles a dump/debug packet which downloads the test program to the specified interface board and executes it. During test program execution, any characters sent to "standard output" will be sent to and displayed at workstation 50. Any characters typed at workstation 50 will be sent to the interface board and buffered as "standard input". When the test program terminates, the termination code is displayed at the workstation and the "connection" is terminated.

The C (connect) command (S1209) will assemble a dump/debug packet designed to establish a connection between the workstation and the specified interface board. The user will be informed as to the success or failure of the attempt. If <netnum> is not specified, the "connect" attempt is made on the local network. If #<seq> is specified, the "connect" operation will use the <netnum>:<macaddress> displayed on the corresponding line of the most recent "list" display. If the command is successful, the Debug Utility enters "debug" mods (S1210), which is detailed in FIG. 12B. Any characters sent to "standard output" by programs executing on the interface board will be displayed at workstation 50. Any characters (other than the asynchronous break-in character) will be sent to the interface board and buffered until read as "standard input". If the asynchronous break-in character (exclamation point) is entered, a debug/dump packet containing a "stop" command will be sent to the "connected" interface board and "interactive debug" mode (described below) will be entered.

The Q (quit) command (S1213 and S1214) exits CPDebug.

[Interactive Debug]

FIG. 12B shows the "debug" mode which the user enters after successful execution of the "connect" command (S1210). On initial entry into the "debug" mode, and as mentioned above in connection with steps S1209 and S1210, output from interface board 22 which would ordinarily be directed to serial interface 19 is instead redirected to the local area network (step S1216). Likewise, input which interface board 22 would ordinarily expect from serial interface 19 is instead redirected so that it is received from the local area network. Thus, standard serial output from interface board 22 is redirected to the LAN where it is displayed at workstation 50, and user input from workstation 50 is redirected so that it is received by the interface board via the LAN.

No other actions except redirection of serial input and output are taken in the "debug" mode until a user at the workstation enters an "asynchronous break-in" command (step S1217), such as an exclamation point ("!"). When the user enters the asynchronous break-in command, flow advances to step S1218 in which an interactive debug mode is entered by sending a "stop" packet to interface board 22. When a response packet is received by workstation 50 from interface board 22, confirming that the interface board has stopped execution, workstation 50 issues a series of "dump" commands so as to obtain the contents of the interface board's registers. Thereafter, the workstation displays register contents, unassembles one instruction at the current CS:IP, and displays an interactive debug prompt (step S1219) which may be a minus sign ("−"). At this point, the user at workstation 50 may enter any of the following commands:

D [<addr>[ <ww>|L<ww>]]
E <addr>{ <bb>|<qstring>} . . .
G [<addr>] . . .
I <ww>
O <ww> <bb>
Q
R [rr[+<ww>]]
T
U [<addr>[ <ww>|L<ww>]]
?

where:
<rr> is a register name: AX, BX, CX, DX, SP, BP, SI, DI, ES, CS, SS, DS, IP or FL;
<ss> is a segment register name: ES, CS, SS or DS;
<addr> is an address <ss>:<ww> or <ww>:<ww> or <ww>;
<bb> is a one- or two-digit hexadecimal value;
<ww> is a one- to four-digit hexadecimal value; and
<qstring> is a sequence of ASCII characters enclosed within single or double quotes (and not containing the quote character).

The foregoing commands are discussed in detail below. After each command is received (stop S1220), it is inspected to determine whether it is a G ("go") command (step S1221). If it is not a "go" command, then in stop S1222 an appropriate dump/debug packet is assembled, if needed and as detailed below, so as to cause execution of the entered command. Thereafter, flow returns to step S1219 in which the debug mode prompt is again displayed so as to permit the user to enter a new debug command.

On the other hand, if in step S1222, the user entered a "go" command, then flow advances to step S1223 in which a "go" packet is sent to interface board 22. Upon receipt of the "go" packet, the interface board resumes program execution, with whatever modifications may have been made by the user executing one of the above debug commands from workstation 50. Workstation 50 does not issue a debug prompt, but rather returns to step S1219 in which redirected serial output from interactive board 22 is displayed at the workstation, and in which user input at workstation 50 is redirected so that it is received by the interactive board over the LAN. Only if the user at workstation 50 enters another asynchronous break-in command (step S1217), or if the interface board arrives at a previously set "break point", will the user at workstation 50 again receive a debug prompt and be permitted to enter one of the above debug commands.

With regard to the specific details of the above debug commands, the D (dump) command assembles a dump/debug packet designed to elicit a dump/debug response from interface board 10 so as to display the contents of a specified memory area in hexadecimal byte and ASCII format. If no segment address is specified, DS is assumed. It no address is specified, DS:oldoffset is assumed (where oldoffset is one greater than the offset of the last byte most recently dumped). If no limit (<ww>) or length (L <ww>) is specified, 128 bytes are dumped.

The E (enter) command assembles a dump/debug packet to store the specified hexadecimal byte values in the interface board memory starting at the specified address. If the operand field contains one or more quoted strings, each such item causes a number of byte values equal to the length of the string (not including the enclosing delimiters) to be stored.

The G (go) command assembles a dump/debug packet which directs the MLID to resume execution, using the currently displayed register values. If one or more address operands are specified, the MLID substitutes breakpoint instructions at the specified addresses before resuming. If a breakpoint is reached during execution, the MLID returns to the "stopped" state and all breakpoint locations are restored to their previous values. If no breakpoint is reached, the user can re-enter "interactive debug" mode by typing an exclamation point.

The I (input) command assembles a dump/debug packet which causes a byte "in" instruction to be executed on the interface board at the specified port address. The value read is displayed at workstation 50.

The O (output) command assembles a dump/debug packet which causes a byte "out" instruction to be executed on the interface board at the specified port address writing the specified value.

The Q (quit) command assembles a dump/debug packet which resumes execution on the interface board, terminates the "connection" with the interface board and exits "interactive debug" mode, returning to the "CPDebug:" prompt.

The R (register) command displays the contents of all the interface board processor registers ("R" by itself), displays the contents of a single processor register ("R <rr>"), or alters the content of a register ("R <rr>=<ww>").

The T (trace) command assembles a dump/debug packet which causes interface board 10 to resume execution with the TF bit set in the FLAGS register. This causes one instruction to be executed at the interface board, after which execution is again "stopped" and the registers are displayed along with the unassembled "next" instruction.

The U (unassemble) command assembles a dump/debug packet which displays the contents of a specified memory area in unassembled format. If no segment address is specified, CS is assumed. If no address is specified, CS:oldoffset is assumed (where oldoffset is one greater than the offset of the last byte most recently unassembled). If no limit (<ww>) or length LL <ww>) is specified, 32 bytes are unassembled.

The ? (help) command displays a brief version of available commands.

The invention has been described with respect to a particular illustrative embodiment. It is to be understood that the invention is not limited to the above described embodiment and that various changes and modifications may be made by those of ordinary skill in the art without departing from the spirit and scope of the invention.

What is claimed is:

1. A network device that interfaces between a local area network (LAN) and a network peripheral, comprising:

a protocol stack which extends from a physical network layer, through an interrupt-driven data link layer, to an application layer which services the network peripheral, the data link layer including a software module which is triggered by receipt of a packet from a remote user over the local area network containing a unique dump/debug packet header and a data portion, thereby placing the network device into an interrupt-disabled state, which interprets dump/debug commands stored in the data portion of the packet, and which in the interrupt-disabled state executes the dump/debug commands, and wherein the network device maintains the interrupt-disabled state until a command to resume execution is received from a remote user over the local area network and executed by the network device.

2. A network device according to claim 1, wherein the software module in said data link layer sends a response packet confirming that dump/debug command execution has been completed.

3. A network device according to claim 1, wherein the dump/debug commands include commands to dump some or all of the contents of a memory on the network device.

4. A network device according to claim 1, wherein the dump/debug commands include commands to store data from the packet to specific locations of a memory on the network device.

5. A network device according to claim 1, wherein the execution of the dump/debug command causes the network device to suspend the execution of currently executing software in the application layer until a dump/debug command to resume execution is received and executed by the network device.

6. A network device according to claim 1, wherein the execution of the dump/debug command causes the application layer to defer the processing of all incoming data packets received during the execution of the dump/debug command until a dump/debug command to resume execution is received and executed by the network device.

7. A network device according to claim 1, wherein the execution of the dump/debug command causes the data link layer to ignore the processing of all subsequent incoming dump/debug commands from a different source received during the execution of the dump/debug command until a dump/debug command to resume execution is received and executed by the network device.

8. A network device according to claim 1, wherein the dump/debug command to resume execution includes commands to instruct the network device to quit the interrupt-disabled state and resume normal operations so as to allow for the dump/debug command from a different source to be processed.

9. A network device that interfaces between a local area network (LAN) and a network peripheral, comprising:
 a protocol stack which extends from a physical network layer, through an interrupt-driven data link layer, to an application layer which services the network peripheral, the data link layer including a software module which is triggered by receipt of a packet from a remote user over the local area network containing a unique dump/debug packet header and a data portion, thereby placing the network device into an interrupt-disabled state, which interprets dump/debug commands stored in the data portion of the packet, and which in the interrupt-disabled state executes the dump/debug commands,
 wherein the network device maintains the interrupt-disabled state until a command to resume execution is received from a remote user over the local area network and executed by the network device,
 wherein the dump/debug commands include commands to store data from the packet to specific locations of a memory on the network device, and
 wherein storage of predetermined pieces of data causes the network device to enter into a debug mode of operation.

10. A network device according to claim 9, wherein storage of the predetermined piece of data causes a subsequent break-in into a debug mode.

11. A network device according to claim 9, wherein the software module in the data link layer sends a response packet confirming that dump/debug command execution has been completed.

12. A network device according to claim 9, wherein the dump/debug commands include commands to dump some or all of the contents of a memory on the network device.

13. A network device according to claim 9, wherein the execution of the dump/debug command causes the network device to suspend the execution of all currently executing software in the application layer until a dump/debug command to resume execution is received and executed by the network device.

14. A network device according to claim 9, wherein the execution of the dump/debug command causes the application layer to defer the processing of all incoming data packets received during the execution of the dump/debug command until a dump/debug command to resume execution is received and executed by the network device.

15. A network device according to claim 9, wherein the execution of the dump/debug commands causes the data link layer to ignore the processing of subsequent incoming dump/debug commands from a different source received during the execution of the dump/debug command until a dump/debug command to resume execution is received and executed by the network device.

16. A network device according to claim 9, wherein the dump/debug command to resume execution include commands to instruct the network device to quit the interrupt-disabled state and resume normal operations so as to allow for the dump/debug command from a different source to be processed.

17. A computer-executable utility on a workstation of a local area network (LAN) to which is connected an interface board for a network peripheral, the computer-executable utility comprising:
 a user interface for accepting user-originated dump/debug commands;
 process steps to construct a dump/debug network packet containing at least one dump/debug command, in accordance with one of the user-originated commands;
 process steps to send the dump/debug packet across the LAN to the interface board, the dump/debug packet including a sequence number;
 process steps to receive a response dump/debug packet originating from the interface board via the LAN, the response dump/debug packet including a sequence number;
 process steps to verify the response dump/debug packet by comparing the sequence number of the dump/debug packet to the sequence number of the response dump/debug packet; and
 process steps to display to the user dump/debug results which are based on the response dump/debug packet in a case that the response dump/debug packet has been verified.

18. A computer-executable utility according to claim 17, further comprising process steps to re-send dump/debug packets in a case that the response dump/debug packet is not verified.

19. A computer-executable utility on a workstation of a local area network (LAN) to which is connected an interface board for a network peripheral, comprising:
 a user interface for accepting user-originated dump/debug commands;
 process steps to construct a dump/debug network packet containing at least one dump/debug command, in accordance with one of the user-originated commands;

process steps to send the dump/debug packet across the LAN to the interface board, the dump/debug packet including a sequence number;

process steps to receive a response dump/debug packet originating from the interface board via the LAN;

process steps to verify the response dump/debug packet by comparing the sequence number of the dump/debug packet to the sequence number of the response dump/debug packet; and process steps to display to the user dump/debug results which are based on the response dump/debug packet in a case that the response dump/debug packet has been verified;

wherein the sequence number of the dump/debug packet is incremented from a preceding dump/debug packet.

20. A computer-executable utility according to claim 19, further comprising process steps to re-send dump/debug packets in a case that the response dump/debug packet is not verified.

21. A network device that interfaces between a local area network (LAN) and a network peripheral, comprising:

a protocol stack which extends from a physical network layer, through an interrupt-driven data link layer, to an application layer which services the network peripheral, the data link layer including a software module which is triggered by a unique dump/debug packet header, which interprets dump/debug commands stored in the data portion of the packet, and which in the interrupt-disabled state executes the dump/debug commands, wherein the network device maintains the interrupt-disabled state until a command to resume execution is received and executed by the network device, and wherein the dump/debug commands include commands to open and close a connection to a particular network workstation so as to recognize dump/debug packets from the network workstation only, to transmit data from a memory on the network device to the LAN, to store data from a packet in a memory on the network device, and to suspend and resume execution of the software module.

22. A network device that interfaces between a local area network (LAN) and a network peripheral, comprising:

a protocol stack which extends from a physical network layer, through an interrupt-driven data link layer, to an application layer which services the network peripheral, the data link layer including a software module which is triggered by a unique dump/debug packet header, which interprets dump/debug commands stored in the data portion of the packet, and which in the interrupt-disabled state executes the dump/debug commands, wherein the network device maintains the interrupt-disabled state until a command to resume execution is received and executed by the network device, wherein the dump/debug commands include commands to open and close a connection to a particular network workstation so as to recognize dump/debug packets from the network workstation only, to transmit data from a memory on the network device to the LAN, to store data from a packet to specific locations of a memory on the network device, and to suspend and resume execution of the software module, and wherein storage of predetermined pieces of data causes the network device to enter into a debug mode of operation.

23. A network workstation connected to a local area network (LAN), for requesting and receiving dump/debug information from an interface board which interfaces a network peripheral to the LAN, comprising:

a user interface for accepting user-originated dump/debug commands;

a memory which stores executable process steps; and a processor which executes the process steps stored in the memory (1) to construct a dump/debug network packet containing a unique dump/debug identification header and at least one dump/debug command, in accordance with one of the user-originated commands, (2) to send the dump/debug packet across the LAN to the interface board, the dump/debug packet including a sequence number, (3) to receive a response dump/debug packet originating from the interface board via the LAN, the response dump/debug packet including a sequence number, (4) to verify the response dump/debug packet by comparing the sequence number of the dump/debug packet to the sequence number of the response dump/debug packet, and (5) to display to the user dump/debug results which are based on the response dump/debug packet in a case that the response dump/debug packet has been verified.

24. A network workstation according to claim 23, wherein the sequence number of the dump/debug packet is incremented from a preceding dump/debug packet.

25. A network workstation according to claim 23, wherein the processor executes process steps to re-send dump/debug packets in a case that the response dump/debug packet is not verified.

26. A method of requesting and receiving dump/debug information in a workstation connected to a local area network (LAN) to which is connected an interface board which interfaces a network peripheral to the LAN, the method comprising the steps of:

constructing a dump/debug network packet in accordance with one of a plurality of user-originated commands entered on the network workstation, the dump/debug network packet containing a unique dump/debug identification header and at least one dump/debug command;

sending the dump/debug packet across the LAN to the interface board, the dump/debug packet including a sequence number;

receiving, via the LAN, a response dump/debug packet originating from the interface board, the response dump/debug packet including a sequence number;

verifying the response dump/debug packet by comparing the sequence number of the dump/debug packet to the sequence number of the response dump/debug packet; and displaying to the user dump/debug results which are based on the response dump/debug packet in a case that the response dump/debug packet has been verified.

27. A method according to claim 26, wherein the sequence number for the dump/debug packet is incremented from a preceding dump/debug packet.

28. A method according to claim 26, further comprising the step of re-sending dump/debug packets in a case that the response dump/debug packet is not verified.

29. A computer-readable medium which stores computer-executable process steps, the computer-executable process steps to request and receive dump/debug information in a workstation connected to a local area network (LAN) to which is connected an interface board which interfaces a network peripheral to the LAN, the computer-executable process steps comprising:

a constructing step to construct a dump/debug network packet in accordance with one of a plurality of user-originated commands entered on the network workstation, the dump/debug network packet containing a unique dump/debug identification header and at least one dump/debug command;

a sending step to send the dump/debug packet across the LAN to the interface board, the dump/debug packet including a sequence number;

a receiving step to receive, via the LAN, a response dump/debug packet originating from the interface board, the response dump/debug packet including a sequence number;

a verifying step to verify the response dump/debug packet by comparing the sequence number of the dump/debug packet to the sequence number of the response dump/debug packet; and a displaying step to display to the user dump/debug results which are based on the response dump/debug packet in a case that the response dump/debug packet has been verified.

30. A computer-readable medium according to claim 29, wherein the sequence number for the dump/debug packet is incremented from a preceding dump/debug packet.

31. A computer-readable medium according to claim 29, further comprising a step to re-send dump/debug packets in a case that the response dump/debug packet is not verified.

32. A network device that interfaces between a local area network (LAN) and a network peripheral, comprising:

a protocol stack which extends from a physical network layer, through an interrupt-driven data link layer, to an application layer which services the network peripheral, the data link layer including a software module which is triggered by a unique dump/debug packet header, which interprets dump/debug commands stored in the data portion of the packet, and which in the interrupt-disabled state executes the dump/debug commands, wherein the network device maintains the interrupt-disabled state until a command to resume execution is received and executed by the network device, and wherein the dump/debug commands are executed exclusively in the data link layer.

33. A network device that interfaces between a local area network (LAN) and a network peripheral, comprising:

a protocol stack which extends from a physical network layer, through an interrupt-driven data link layer, to an application layer which services the network peripheral, the data link layer including a software module which is triggered by a unique dump/debug packet header, which interprets dump/debug commands stored in the data portion of the packet, and which in the interrupt-disabled state executes the dump/debug commands, wherein the network device maintains the interrupt-disabled state until a command to resume execution is received and executed by the network device, wherein the dump/debug commands include commands to store data from the packet to specific locations of a memory on the network device, wherein storage of predetermined pieces of data causes the network device to enter into a debug mode of operation, and wherein the dump/debug commands are executed exclusively in the data link layer.

* * * * *